US012185835B2

(12) United States Patent
Hanley

(10) Patent No.: US 12,185,835 B2
(45) Date of Patent: Jan. 7, 2025

(54) DRAWER ASSEMBLY

(71) Applicant: DEJANA TRUCK AND UTILITY EQUIPMENT CO., INC., Kings Park, NY (US)

(72) Inventor: Charles L Hanley, North Smithfield, RI (US)

(73) Assignee: Dejana Truck and Utility Equipment Co., Inc., Kings Park, NY (US)

( * ) Notice: Subject to any disclaimer, the term of this patent is extended or adjusted under 35 U.S.C. 154(b) by 0 days.

(21) Appl. No.: 18/503,429

(22) Filed: Nov. 7, 2023

(65) Prior Publication Data

US 2024/0074580 A1 Mar. 7, 2024

Related U.S. Application Data

(63) Continuation of application No. 17/827,341, filed on May 27, 2022, now Pat. No. 11,918,114, which is a continuation of application No. 17/152,189, filed on Jan. 19, 2021, now Pat. No. 11,357,326.

(51) Int. Cl.

| | |
|---|---|
| ***B65G 1/137*** | (2006.01) |
| ***A47B 88/467*** | (2017.01) |
| ***A47B 88/50*** | (2017.01) |
| ***A47B 88/57*** | (2017.01) |
| ***A47B 95/02*** | (2006.01) |
| ***E05B 65/46*** | (2017.01) |

(52) U.S. Cl.
CPC ............ *A47B 88/467* (2017.01); *A47B 88/50* (2017.01); *A47B 88/57* (2017.01); *E05B 65/46* (2013.01); *A47B 2095/021* (2013.01); *A47B 2210/0059* (2013.01)

(58) Field of Classification Search
CPC ....... A47B 88/467; A47B 88/50; A47B 88/57; A47B 2095/021; A47B 2210/0059; A47B 95/02; E05B 65/46
See application file for complete search history.

(56) References Cited

U.S. PATENT DOCUMENTS

| | | | |
|---|---|---|---|
| 1,720,260 | A | 7/1929 | Bowen et al. |
| 2,729,498 | A | 1/1956 | Law |
| 2,784,027 | A | 3/1957 | Temp |
| 2,825,617 | A | 3/1958 | Morgan |

(Continued)

FOREIGN PATENT DOCUMENTS

| | | | |
|---|---|---|---|
| EP | 2253432 | B1 | 3/2019 |
| JP | 2011212274 | A | 10/2011 |
| WO | 2008018799 | A1 | 2/2008 |

*Primary Examiner* — Hanh V Tran
(74) *Attorney, Agent, or Firm* — Sorell, Lenna & Schmidt, LLP

(57) ABSTRACT

A drawer assembly includes a member having a first locking element. A drawer includes a frame and a handle having a first portion and a second portion. The first portion is coupled to the frame. The second portion is coupled to the first portion. A drawer release includes a first end and a second end and is rotatably coupled to the drawer. The first end includes a second locking element. The second portion is rotatable relative to the first portion to move the drawer release between a first orientation in which the second locking element directly engages the first locking element to prevent the drawer from translating relative to the member and a second orientation in which the second locking element is spaced apart from the first locking element to allow the drawer to translate relative to the member.

20 Claims, 24 Drawing Sheets

(56) References Cited

U.S. PATENT DOCUMENTS 3,133,768 A 5/1964 Klakovich
3,589,768 A 6/1971 Wilson
3,757,967 A 9/1973 Colbridge
3,953,094 A 4/1976 Brown, Jr. ........... G11B 17/032 292/336.3
4,030,609 A 6/1977 Liebetrau et al.
4,131,203 A 12/1978 Bridges
4,482,066 A 11/1984 Dykstra
4,705,315 A 11/1987 Cherry
4,889,377 A 12/1989 Hughes
4,899,895 A 2/1990 Espasandin et al.
4,917,430 A 4/1990 Lawrence
4,947,661 A 8/1990 Yoshida .............. B60R 11/0205 292/226
4,950,123 A 8/1990 Brockhaus
5,064,335 A 11/1991 Bergeron et al.
5,269,447 A 12/1993 Gower et al.
5,470,144 A 11/1995 Wen
5,571,256 A 11/1996 Good et al.
5,775,140 A 7/1998 Hallsten
5,845,952 A 12/1998 Albertini et al.
5,988,722 A 11/1999 Parri
6,065,792 A 5/2000 Sciullo et al.
6,244,646 B1 6/2001 Wheeler, III
6,328,365 B1 12/2001 Adsit
6,390,525 B2 5/2002 Carpenter et al.
6,431,615 B1 8/2002 Bastian
6,527,353 B1 3/2003 Bradfish et al.
6,547,289 B1 4/2003 Greenheck .............. E05B 65/46 292/200
6,659,524 B1 12/2003 Carlson
6,659,577 B2 12/2003 Lauchner
6,702,342 B2 3/2004 Molzer
6,715,807 B2 4/2004 Molzer
6,758,508 B2 7/2004 Weyhrich
6,834,923 B2 12/2004 Young et al.
6,868,703 B2 3/2005 Molzer
6,938,967 B2 9/2005 Dubon et al.
6,997,527 B2 2/2006 Cheng ..................... E05B 65/46 312/333
7,048,347 B1 5/2006 Liu ......................... E05B 65/46 312/333
7,121,603 B2 10/2006 Stevenson et al.
7,124,475 B2 10/2006 Jeffries
7,152,889 B2 12/2006 Jeffries
7,219,952 B2 5/2007 Taylor
7,232,172 B2 6/2007 Kiester et al.
7,258,317 B1 8/2007 Nagel
7,338,110 B1 3/2008 Eckloff
7,455,312 B2 11/2008 Senatore
7,604,307 B2 10/2009 Greenwald et al.
7,712,812 B2 5/2010 Gagliano
7,780,254 B2 8/2010 Wang et al.
8,104,851 B2 1/2012 Lu
8,132,875 B2 3/2012 Juang
8,317,278 B2 11/2012 Enos .................... A47B 88/493 312/334.47
8,523,301 B1 9/2013 Britson ................... E05B 65/46 312/334.47
8,596,472 B2 12/2013 Yin ...................... H05K 7/1489 211/26
8,763,820 B2 7/2014 Hanley
9,010,830 B2 4/2015 Howell et al.
9,233,647 B1 1/2016 Hanley et al.
9,381,872 B2 7/2016 Hanley
9,386,847 B1 7/2016 Jeffries
9,504,323 B1 11/2016 Porreca
9,669,773 B2 6/2017 Hanley
9,796,339 B2 10/2017 Hanley et al.
9,833,072 B1 12/2017 Knake
10,004,331 B2 6/2018 Jeffries et al.
10,106,094 B2 10/2018 Hanley
10,172,452 B2 1/2019 Hanley et al.
10,189,413 B2 1/2019 Roldan Gonzalez et al.
10,231,540 B1 3/2019 Hong ...................... E05B 65/46
10,362,870 B1 7/2019 Smith .................. A47B 88/407
10,443,271 B1 10/2019 Rose ....................... E05B 65/46
10,455,937 B2 10/2019 Jeffries et al.
10,538,945 B2 1/2020 Jeffries
10,703,292 B2 7/2020 Hanley
2006/0273605 A1 12/2006 Haspel et al.
2007/0069542 A1 3/2007 Steiger et al.
2008/0150407 A1 6/2008 Mehmen ................. E05B 65/46 29/428
2010/0019636 A1 1/2010 Chen ....................... E05B 65/46 312/332.1
2011/0121701 A1 5/2011 Chang ....................... E05B 7/00 312/332.1
2011/0179839 A1 7/2011 Jeffries
2012/0223630 A1 9/2012 Weng ...................... E05B 65/46 312/333
2014/0339974 A1 11/2014 Gill ........................ B25H 3/028 312/333
2014/0354001 A1 12/2014 Hanley ................... B60P 3/007 296/24.44
2015/0048732 A1 2/2015 Gutierrez .................. E05C 3/14 292/336.3
2015/0061483 A1 3/2015 Liu ........................... E05C 3/14 312/332.1
2015/0379799 A1 12/2015 Kim ....................... G07D 11/40 194/350
2018/0014638 A1 1/2018 Hanley ................ A47B 46/005
2018/0073289 A1 3/2018 Jeffries
2018/0245383 A1 8/2018 Jeffries
2018/0320422 A1 11/2018 Sharp ........................ E05C 1/14
2019/0274424 A1 9/2019 Hanley et al.
2019/0277075 A1 9/2019 Jeffries
2019/0335902 A1 11/2019 Smith
2019/0352938 A1 11/2019 Sonney ................... E05B 65/46
2020/0054133 A1 2/2020 Jeffries et al.

DRAWER ASSEMBLY

CROSS REFERENCE TO RELATED APPLICATIONS

This application is a continuation of U.S. patent application Ser. No. 17/827,341, filed May 27, 2022, which is a continuation of U.S. patent application Ser. No. 17/152,189, filed Jan. 19, 2021, now U.S. Pat. No. 11,357,326. These applications are expressly incorporated herein by reference, in their entireties.

TECHNICAL FIELD

The present disclosure generally relates to drawer assemblies that are used in conjunction with shelves to store items such as, for example, parcels and/or packages, and more particularly to shelving systems for temporarily storing items, wherein one or more drawer assemblies of each shelving system can be unlatched by applying a lifting motion to a handle.

BACKGROUND

Delivery and/or service vehicles such as, for example, trucks, vans and cars may include an assembly having trays positioned on one or more racks located in an interior of the delivery or service vehicle. Items such as, for example, tools, parcels and/or packages are stored on the trays temporarily while the vehicle is being driven to a selected destination, such as, for example, the home or office of a client or a loading dock or storefront of recipient. A driver of the vehicle or other personnel may remove the item or items from the tray once he or she arrives at the selected destination by accessing the item or items through one or more doors of the vehicle, such as, for example, rear doors of a van or truck. Some vehicles include trays that slide relative to the rack to facilitate accessing the item or items by the driver of the vehicle or other personnel. That is, once one or more doors of the vehicle are opened, the driver or other personnel may slide the trays relative to the rack such that the item or items are conveniently located outside of the interior of the vehicle.

In vehicles that include trays that slide relative to the rack, some trays may tend to slide at undesired times such as, for example, when the delivery vehicle makes a sharp turn and/or when the vehicle comes to an abrupt stop, which causes the item or items positioned on the tray to move relative to the tray and/or fall off the tray and onto the floor of the vehicle, potentially damaging the item or items. While some rack and tray assemblies used in vehicles include a locking mechanism to prevent the trays from sliding relative to the rack, the locking mechanisms used encompass only a small portion of the tray, thus making accessing the locking mechanism difficult and/or may require two hands to operate. For example, conventional locking mechanisms include a handle having a thumb release on one side of the handle. In order to lock and/or unlock the tray from the rack, the driver of the vehicle or other personnel is required to apply the thumb release, typically by pressing the thumb release down. Due to the small size and remote location of the thumb release, accessing and/or pressing the thumb release is often difficult, especially when the driver or other personnel is carrying other items. This disclosure describes improvements over these prior art technologies.

SUMMARY

In one embodiment, in accordance with the principles of the present disclosure, a drawer assembly is provided. The drawer assembly includes a member having a first locking element. A drawer comprises a frame and a handle. The handle comprises a first portion and a second portion. The first portion is coupled to the frame. The second portion is coupled to the first portion. A drawer release comprises a first end and a second end. The drawer release is rotatably coupled to the drawer. The first end comprises a second locking element. The second portion is rotatable relative to the first portion to move the drawer release between a first orientation in which the second locking element directly engages the first locking element to prevent the drawer from translating relative to the member and a second orientation in which the second locking element is spaced apart from the first locking element to allow the drawer to translate relative to the member.

In some embodiments, the drawer release is biased to the first orientation. In some embodiments, the drawer release rotates relative to the drawer as the drawer release moves from the first orientation to the second orientation. In some embodiments, the second portion directly engages a bottom surface of the second end such that an upward force applied to the bottom surface by the second portion pivots the second end relative to the drawer to move the drawer release from the first orientation to the second orientation. In some embodiments, the second portion directly engages the second end when the drawer release is in the first orientation. In some embodiments, a lifting motion applied to the second portion causes an extension of the second portion to move in a substantially upward direction such that the extension presses up on a bottom surface of the second end to move the drawer release from the first orientation to the second orientation. In some embodiments, the frame comprises opposite first and second ends, the handle being coupled directly to the first end of the frame, the first locking element comprising a first end surface that faces toward the first end of the frame and an opposite second end surface that faces toward the second end of the frame, the second locking element directly engaging the second end surface when the drawer release is in the first orientation. In some embodiments, the drawer release comprises a plate, a first flange and a second flange, the first flange defining the second locking element, the second portion directly engaging a bottom surface of the second flange such that an upward force applied to the bottom surface by the second portion pivots the drawer release relative to the drawer to move the drawer release from the first orientation to the second orientation, the first and second flanges each extending perpendicular to the plate, the first end extending at an acute angle relative to the second flange. In some embodiments, the handle has a maximum width that is greater than a maximum width of the frame. In some embodiments, the drawer assembly is free of any springs. In some embodiments, the drawer release moves from the first orientation to the second orientation by an operator lifting the second portion. In some embodiments, a rotating motion of the second portion is translated by the drawer release to an upward movement of the second end as the drawer release moves from the first orientation to the second orientation. In some embodiments, the first end is integrally formed with the second end. In some embodiments, the drawer release is monolithic. In some embodiments, a shelf comprises the drawer assembly coupled to a frame of the shelf. In some embodiments, the member is fixed to the frame of the shelf. In some embodiments, the member is an outer member and is fixed to the frame of the shelf, the shelf comprising an inner member movably disposed in a channel of outer member, the drawer comprising a rail coupled to the frame of the drawer, the rail being movably disposed in a channel of the inner member. In some embodiments, the inner member is prevented from sliding relative to the outer member when the drawer release is in the first orientation.

In one embodiment, in accordance with the principles of the present disclosure, a drawer assembly is provided. The drawer assembly includes a member having a first locking element. A drawer comprises a frame and a handle. The handle comprises a first portion and a second portion. The first portion is coupled to the frame. The second portion is coupled to the first portion. The second portion has a maximum width that is greater than a maximum width of the frame. A drawer release comprises a first end and a second end. The drawer release is rotatably coupled to the drawer. The first end comprises a second locking element. The second portion is rotatable relative to the first portion to move the drawer release between a first orientation in which the second locking element directly engages the first locking element to prevent the drawer from translating relative to the member and a second orientation in which the second locking element is spaced apart from the first locking element to allow the drawer to translate relative to the member. The second portion directly engages a bottom surface of the second end such that an upward force applied to the bottom surface by the second portion pivots the drawer release relative to the drawer to move the drawer release from the first orientation to the second orientation.

In one embodiment, in accordance with the principles of the present disclosure, a drawer assembly is provided. The drawer assembly includes a member having a first locking element. A drawer comprises a frame and a handle. The handle comprises a first portion and a second portion. The first portion is coupled to the frame. The second portion is coupled to the first portion. A drawer release comprises a first end and a second end. The drawer release is rotatably coupled to the drawer. The first end comprises a second locking element. The second portion is rotatable relative to the first portion to move the drawer release between a first orientation in which the second locking element directly engages the first locking element to prevent the drawer from translating relative to the member and a second orientation in which the second locking element is spaced apart from the first locking element to allow the drawer to translate relative to the member. A lifting motion applied to the second portion causes an extension of the second portion to move in a substantially upward direction such that the extension presses up on a bottom surface of the second end to move the drawer release from the first orientation to the second orientation.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1:
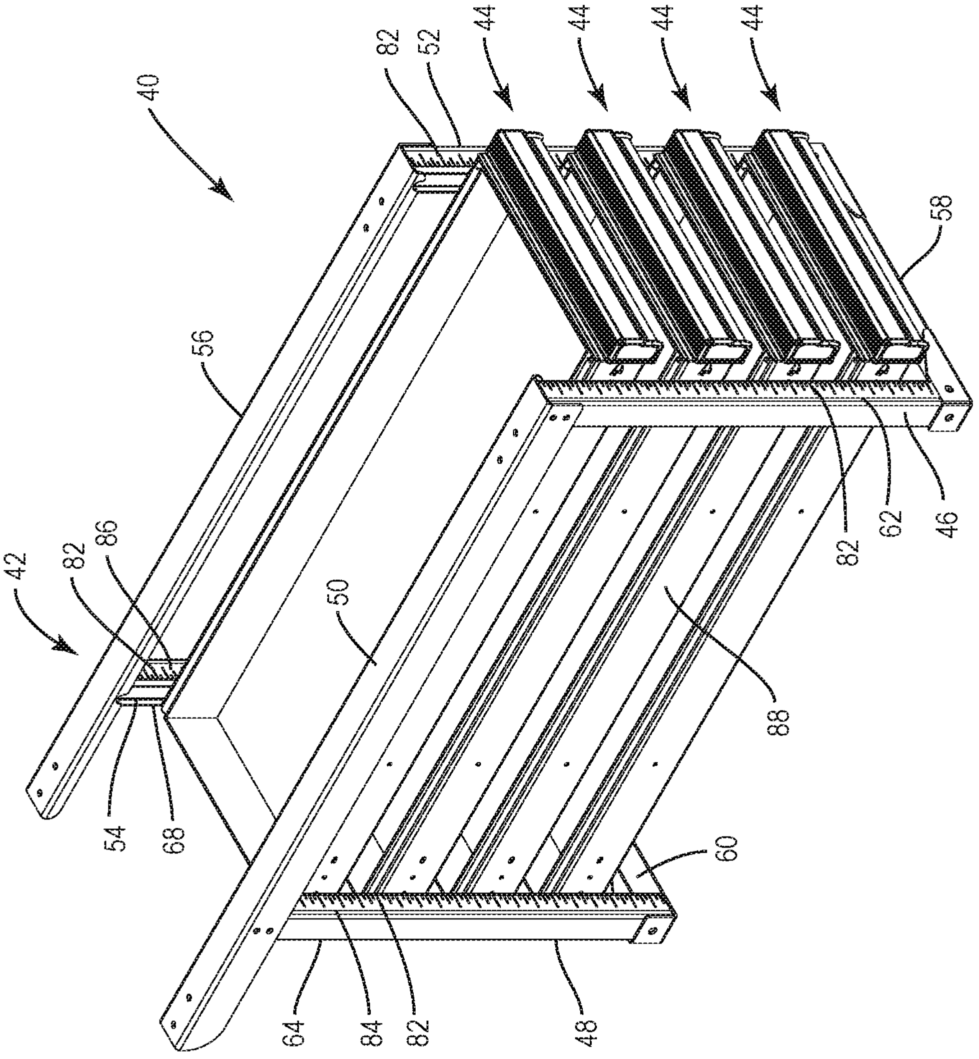
FIG. 1 is a perspective view of one embodiment of a shelving system in accordance with the principles of the present disclosure, with drawer assemblies of the shelving system in a latched or closed orientation.

The exemplary embodiments of a shelving system and related methods of use are discussed in terms of devices for the storage of items. As discussed in greater detail hereinbelow, the shelving systems of the present disclosure include many improvements over conventional shelving systems. For example, while some conventional shelving systems include a spring loaded mechanism with a pin or engaging member that contacts a slide release, the shelving systems of the present disclosure, in contrast do not include any springs or other assist devices and alternatively utilize a release lever that acts directly on a slide release tab. It is envisioned that by not including any springs or other assist devices, the shelving systems of the present disclosure are more robust than conventional shelving systems that include springs or other assist devices, since the mechanism receives the benefit of making use of the spring returns present in the drawer slides.

Some conventional shelving systems include a self-contained spring mechanism with a nylon follower and plastic end cap that constrains the spring mechanism. The shelving systems of the present disclosure, in contrast, rely on the spring returns already built into the drawer slides. In other conventional systems there exists an additional spring turn system and associated components that while enabling a spring assist feature on an uninstalled release device add unnecessary complexity to the complete system. End caps act only as a closeout. That is, the end caps of the shelving systems of the present disclosure serve only as a closeout and for bump protection, and breakage will not affect the operation of the mechanism, whereas in other conventional systems a thin plastic housing encases a self-contained spring mechanism that can be exposed upon breakage.

Some conventional shelving systems include a mechanism guide pin that engages drawer slide lock tabs in a downward motion. The shelving systems of the present disclosure, in contrast, include a handle that directly activates on a release lever in an upward motion. The direct acting release handle is a less complex mechanism that eliminates the need for additional guide pins, springs, and linkages.

Some conventional shelving systems include a release lever that rotates outwardly and is used as a pull handle to open the drawer. The shelving systems of the present disclosure, in contrast, include a release lever that pivots upward as a handle is lifted in order to open and close the drawer. The lifting motion required to disengage the drawer slides is a more natural grasping motion, whereas other conventional systems rely on the mechanism release lever to act as a pulling device.

Excessive opening force creates the potential for the mechanism in some conventional shelving systems to deform slide release lock tabs and may lead to premature system failure. The shelving systems of the present disclosure, in contrast, constrain excessive opening force by the mechanism housing, where slide release tabs will bottom out and limit any damaging deformation, as discussed herein.

When in the situation of premature drawer slide failure, the lock tabs of some conventional shelving systems are free to droop, which causes the entire mechanism to fail in the unlocked position (with undesirable unintended motion of the drawers). Lock tabs of the shelving systems of the present disclosure, in contrast, are constrained by a release lever when in the situation of premature drawer slide failure such that the entire mechanism fails in the locked position (so the drawer will remain locked in the closed position until it can be serviced). That is, the drawers are biased to the locked position, which is preferred over other conventional systems.

Some conventional shelving systems include thin plastic end caps that are prone to breakage, resulting in a mechanism failure. The shelving systems of the present disclosure, in contrast, include thicker plastic end caps that serve as bump protection, and breakage will not affect the operation of the mechanism.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a shelving system, related components and methods of employing the shelving system in accordance with the principles of the present disclosure. Alternate embodiments are also disclosed. Reference will now be made in detail to the exemplary embodiments of the present disclosure, which are illustrated in the accompanying figures. Turning to FIGS. 1-38, there are illustrated components of a shelving system 40.

In some embodiments, system 40 is configured for mounting in a vehicle, such as, for example, a delivery or service vehicle, such as, for example, a van or truck. In some embodiments, system 40 is mounted in the vehicle such that system 40 is accessible through rear doors of the vehicle, but is not readily accessible through side doors, or any other doors of the vehicle. In such embodiments, system 40 is positioned such that system 40 may move from a closed position to an open position when the rear doors of the vehicle open, but is prevented from moving from the closed position to the open position when the rear doors are closed, as will be described. In some embodiments, system 40 is mounted in the vehicle such that system 40 is accessible through one or more side door of the vehicle, but is not readily accessible through rear doors, or any other doors of the vehicle. In such embodiments, system 40 is positioned such that system 40 may move from the closed position to the open position when the side door of the vehicle is open, but is prevented from moving from the closed position to the open position when the side door is closed, as will be described. In some embodiments, system 40 includes a plurality of shelving units, wherein one unit is mounted in the vehicle such that it is accessible through one or more side doors on a first side of the vehicle and another unit is mounted in the vehicle such that it is accessible through one or more side doors on an opposite second side of the vehicle. In some embodiments, system 40 includes the vehicle.

The components of shelving system 40 can be fabricated from materials including metals, polymers and/or composites, depending on the particular application. For example, the components of system 40, individually or collectively, can be fabricated from materials such as aluminum, steel, iron, stainless steel, titanium, titanium alloys, cobalt-chrome, stainless steel alloys, semi-rigid and rigid materials, plastics, elastomers, rubbers and/or rigid polymers. Various components of system 40 may have material composites, including the above materials, to achieve various desired characteristics such as strength, rigidity, elasticity, performance and durability. The components of system 40, individually or collectively, may also be fabricated from a heterogeneous material such as a combination of two or more of the above-described materials. The components of system 40 can be extruded, molded, injection molded, cast, pressed and/or machined. The components of system 40 may be monolithically formed, integrally connected or include fastening elements and/or instruments, as described herein.

System 40 includes a shelf frame 42 and one or more drawer assemblies 44 that are each coupled to frame 42. Frame 42 includes a vertical member 46 that is connected to a vertical member 48 by a horizontal member 50 and a vertical member 52 that is connected to a vertical member 54 by a horizontal member 56. A cross member 58 connects member 46 to member 52 and a cross member 60 connects member 48 to member 54.

Frame 42 has a length L1 from an outer surface 62 of member 46 to an opposite outer surface 64 of member 48 and from an outer surface 66 of member 52 to an opposite outer surface 68 of member 54. Members 50, 56 each have a length L2 from an end surface 70 of member 50 to an opposite end surface 72 of member 50 and from an end surface 74 of member 56 to an opposite end surface 76 of member 56. Length L2 is greater than length L1 such that end surface 70 is flush or substantially flush with outer surface 62, end surface 74 is flush or substantially flush with outer surface 66, an end 78 of member 50 extends outwardly from outer surface 64 and an end 80 of member 56 extends outwardly from outer surface 68. That is, ends 78, 80 form an overhang that extends outwardly from members 48, 54. The overhang is configured for allowing a deeper drawer depth than the vertical guide members would otherwise provide for the system. In some embodiments, length L2 is equal or substantially equal to length L1 such that end surface 70 is flush or substantially flush with outer surface 62, end surface 72 is flush or substantially flush with outer surface 64, end surface 74 is flush or substantially flush with outer surface 66 and end surface 76 is flush or substantially flush with outer surface 68.

In some embodiments, frame 42 includes markings, such as, for example, indicia 82 on one or more components of frame 42. In some embodiments, indicia is configured to illustrate one or more distances along a height of frame 42. For example, in some embodiments, frame 42 includes indicia 82 along all or a portion of outer surface 62, along all or a portion of outer surface 66, along all or a portion of an inner surface 84 of member 48 and/or along all or a portion of an inner surface 86 of member 54. In some embodiments, indicia 82 includes graduated markings and is identical on outer surface 62, outer surface 66, inner surface 84 and/or inner surface 86. In some embodiments, indicia 82 includes one or more markings, letters, words and/or numbers correlating to a distance along member 46 or member 52 from member 58 and/or a distance along member 48 or member 54 from member 60. In some embodiments, indicia 82 correlates to units of measurement, such as, for example, millimeters, centimeters, inches, feet, etc. In some embodiments, indicia 82 are consecutively numbers, beginning at ends of members 46, 52 that engage member 58 and at ends of members 48, 54 that engage member 60. Inner surface 84 is opposite outer surface 64 and inner surface 86 is opposite outer surface 68.

Drawer assemblies 44 each include a cross member, such as, for example, an outer member 88 and a cross member, such as, for example, an outer member 90. Member 88 comprises an outer surface 92 and an inner surface 94 opposite outer surface 92 and member 90 comprises an outer surface 96 and an inner surface 98 opposite outer surface 96. Member 88 is coupled to frame 42 such that outer surface 92 directly engages members 46, 48 and member 88 extends perpendicular to members 46, 48. Member 90 is coupled to frame 42 such that outer surface 96 directly engages members 52, 54 and member 90 extends perpendicular to members 52, 54.

In some embodiments, member 88 is permanently coupled to members 46, 48 such that member 88 cannot be moved relative to members 46, 48 without breaking at least one of members 46, 48, 88 and member 90 is permanently coupled to members 52, 54 such that member 90 cannot be moved relative to members 52, 54 without breaking at least one of members 52, 54, 90.

In some embodiments, member 88 is removably coupled to members 46, 48 such that member 88 can be moved relative to members 46, 48 without breaking at least one of members 46, 48, 88 and member 90 is removably coupled to members 52, 54 such that member 90 can be moved relative to members 52, 54 without breaking at least one of members 52, 54, 90. This allows member 88 to be selectively positioned along lengths of members 46, 48 and member 90 to be selectively positioned along lengths of members 52, 54, wherein members 88, 90 are each provisionally fixed to frame 42 after being selectively positioned along lengths of members 52, 54.

In some embodiments, indicia 82 on members 46, 48, 52, 54 is used to ensure that member 88 extends perpendicular to members 46, 48, member 90 extends perpendicular to members 52, 54 and that member 88 is positioned at the same distance along heights of members 46, 48 as member 90 is positioned at along heights of members 52, 54. That is, indicia 82 may be used to ensure that member 88 extends perpendicular to members 46, 48, member 90 extends perpendicular to members 52, 54, member 88 is positioned at a first distance from members 58, 60 along heights of members 46, 48 and member 90 is also positioned at the first distance from members 58, 60 along heights of members 52, 54.

Figure 15:
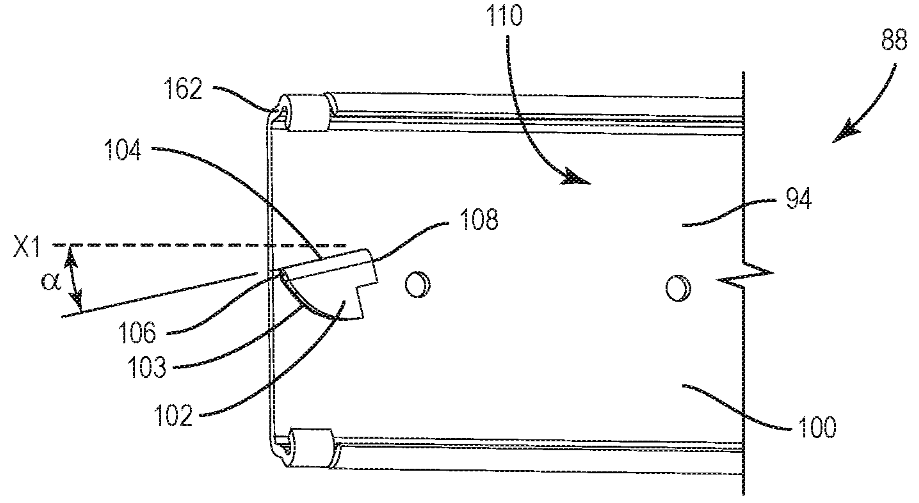
FIG. 15 is a close up, perspective view of a portion of the component shown in FIG. 13.
Figure 16:
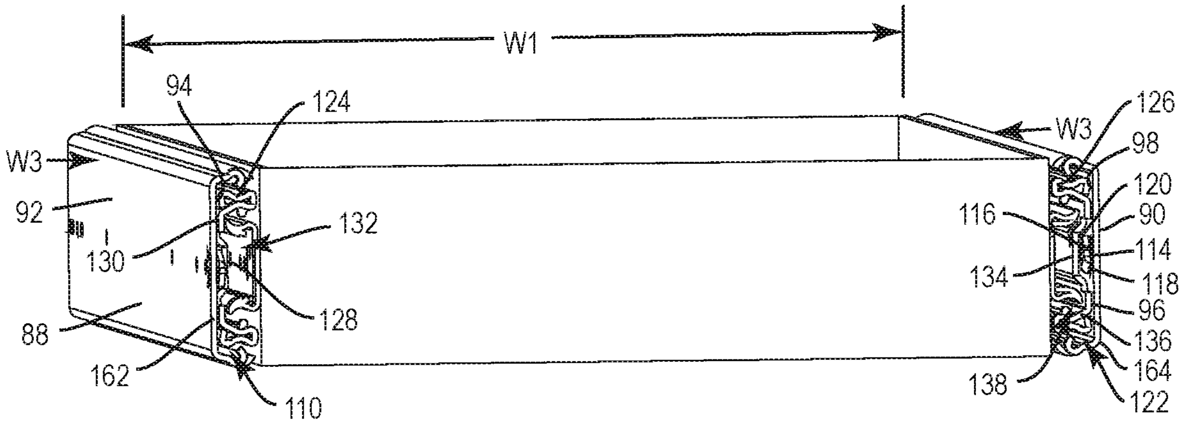
FIG. 16 is a perspective view of the component shown in FIG. 13 coupled to the component shown in FIG. 8 and the component shown in FIG. 10.
Figure 17:
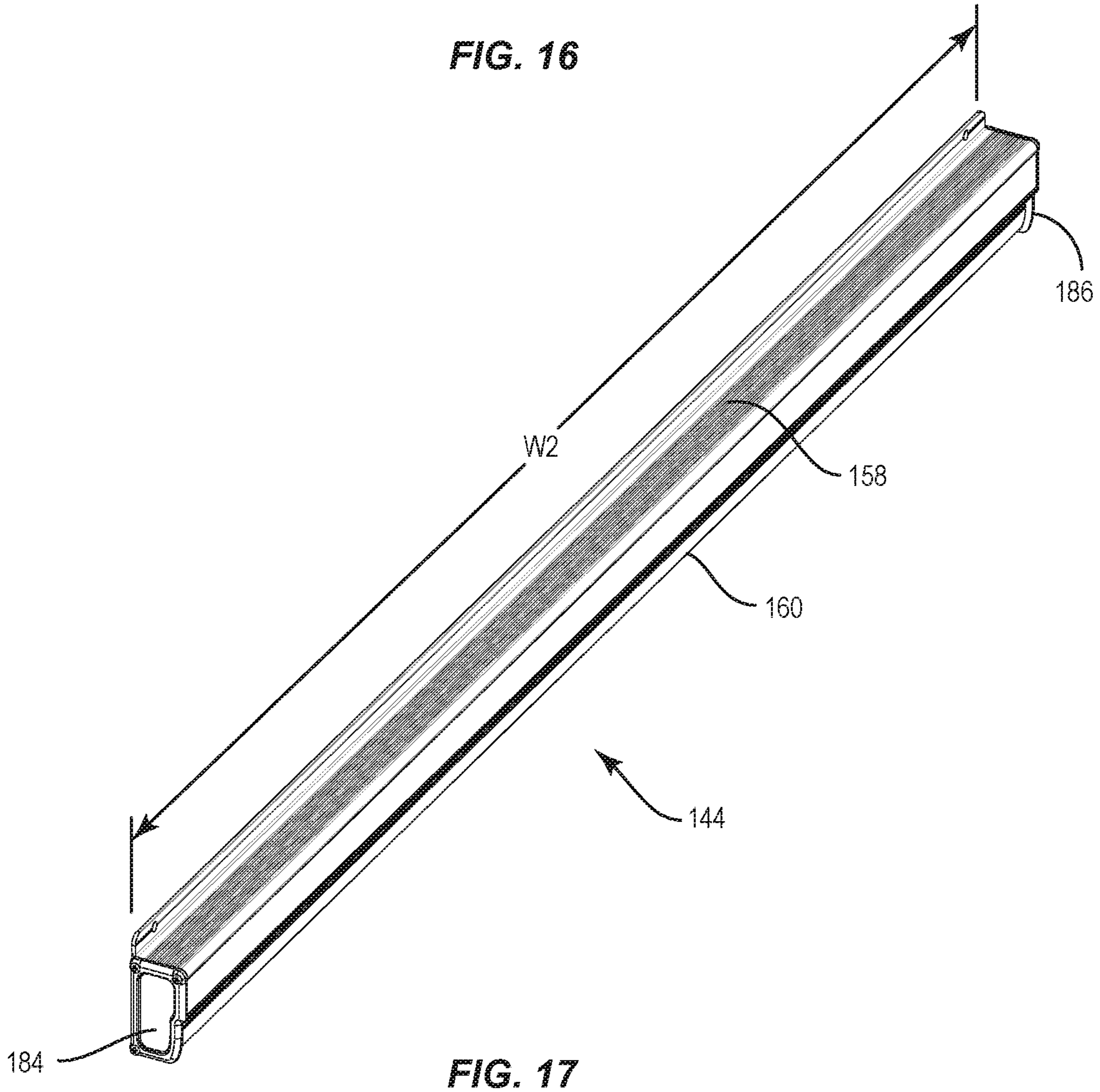
FIG. 17 is a perspective view of components of the drawer assembly shown in FIG. 3.
Figure 18:
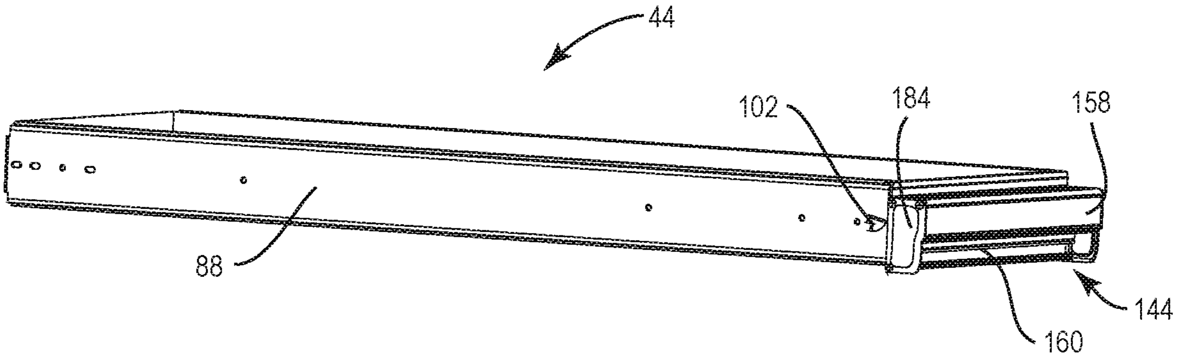
FIG. 18 is a perspective view of the drawer assembly shown in FIG. 3, with the drawer assembly in the latched or closed orientation.
Figure 19:
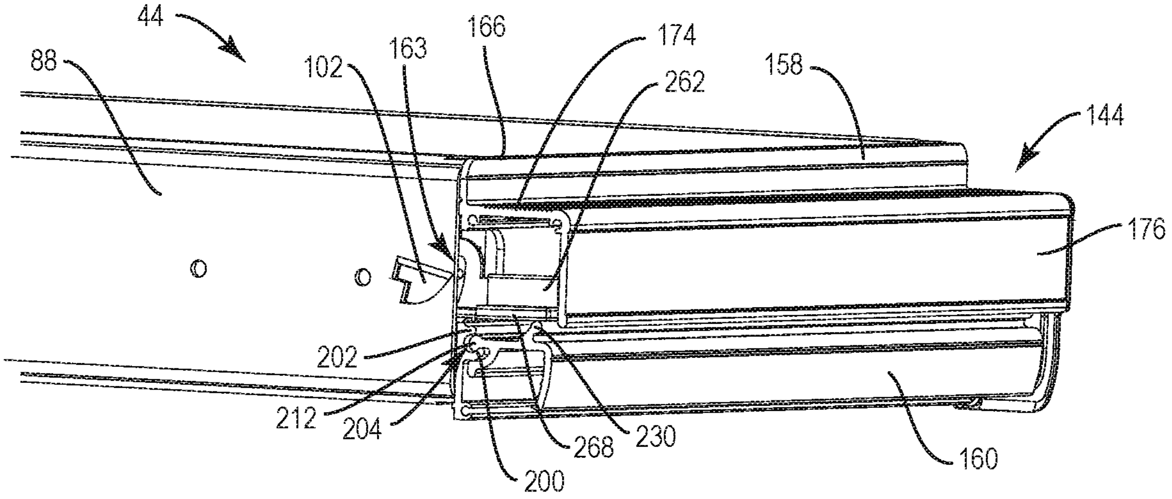
FIG. 19 is a perspective view of a portion of the drawer assembly shown in FIG. 3, with the drawer assembly in the latched or closed orientation and one or more parts removed.

Member 88 comprises a wall 100 that includes surfaces 92, 94. Wall 100 defines a slide release tab or a locking element, such as, for example, a flange 102 extending inwardly from inner surface 94. Flange 102 includes a top portion 104 that extends continuously from an end surface 106 to an opposite end surface 108, as shown in FIG. 15, for example. Portion 104 extends directly from surface 94 such that there is no space or gap between surface 94 and portion 104. Portion 104 is linear and/or planar from end surface 106 to end surface 108. In some embodiments, portion 104 extends at an angle α relative to a longitudinal axis X1 defined by the length of member 88. Inner surface 94 defines a channel 110 that extends along axis X1. In some embodiments, angle α is an acute angle. In some embodiments, angle α is an angle between about 1 degree and about 45 degrees. In some embodiments, angle α is an angle between about 1 degree and about 35 degrees. In some embodiments, angle α is an angle between about 1 degree and about 25 degrees. In some embodiments, angle α is an angle between about 1 degree and about 15 degrees. In some embodiments, angle α is an angle between about 1 degree and about 5 degrees.

Member 90 comprises a wall 112 that includes surfaces 96, 98. Wall 112 defines a slide release tab or a locking element, such as, for example, a flange 114 extending inwardly from inner surface 98. Flange 114 includes a top portion 116 that extends continuously from an end surface 118 to an opposite end surface 120. Portion 116 extends directly from surface 98 such that there is no space or gap between surface 98 and portion 116. Portion 116 is curved and/or arcuate from end surface 118 to end surface 120. The length of member 90 defines a longitudinal axis X2. Inner surface 98 defines a channel 122 that extends along axis X2.

In some embodiments, member 88 is structurally identical to member 90. That is, the difference between member 88 of drawer assembly 44 and member 90 of the same drawer assembly 44 is the manner in which it is mounted to frame 42. For example, flange 102 is identical to flange 114. However, when member 88 is mounted to frame 42, a linear portion of flange 102 (portion 104) faces toward a top of member 88 and a curved portion 103 of flange 102 faces toward a bottom of member 88, as shown in FIG. 15, and when member 90 is mounted to frame 42, a curved portion of flange 114 (portion 116) faces toward a top of member 90 and a linear portion 115 of flange 114 faces toward a bottom of member 90, as shown in FIG. 31A.

Drawer assemblies 44 each include a cross member, such as, for example, an inner member 124 and a cross member, such as, for example, an inner member 126. Member 124 is configured to be slidingly positioned in channel 110 such that member 124 is parallel and/or coaxial with axis X1 and member 126 is configured to be slidingly positioned in channel 122 such that member 126 is parallel and/or coaxial with axis X2. Member 124 includes an inner surface 128 and an opposite outer surface 130. Surface 128 defines a channel 132. Member 124 is positioned in channel 110 such that surface 130 faces surface 94 of member 88. Member 126 includes an inner surface 134 and an opposite outer surface 136. Surface 134 defines a channel 138. Member 126 is positioned in channel 122 such that surface 136 faces surface 98 of member 90.

Drawer assemblies 44 each include a drawer 140 having a drawer frame 142 and a handle 144 coupled to frame 142. Frame 142 includes an end wall 146 and an opposite end wall 148. A side wall 150 extends from end wall 146 to end wall 148 and an opposite side wall 152 extends from end wall 146 to end wall 148 such that side wall 152 is spaced apart from side wall 150 by end walls 146, 148. Drawer 140 includes a tray 151 extending from wall 146 to wall 148 and from wall 150 to wall 152. In some embodiments, tray 151 joins bottom ends of walls 146, 148, 150, 152. Tray 151 is configured to support items within drawer 140. That is, one or more items can be stored within drawer 140 such that the item(s) is/are positioned on top of tray 151 and are positioned between walls 146, 148 and/or walls 150, 152. Frame 142 has a width W1 defined by the distance from side wall 150 to side wall 152. Drawer 140 further includes rails 154, 156 that are coupled to frame 142. Rail 154 is coupled directly to side wall 150 and rail 156 is coupled directly to side wall 152. Rail 154 is configured to be slidably disposed in channel 132 of member 124 and rail 156 is configured to be slidably disposed in channel 138 of member 126. Drawer 140 is configured to temporarily store one or more items until the one or more items is/are retrieved. In some embodiments, items that are stored in or on drawer 140 are visible when drawer assembly 44 is in the latched or closed orientation. For example, the items are visible between members 46, 48 and/or between members 52, 54 and between adjacent drawers 140, as can be seen from FIGS. 1 and 2, for example. That is, there is no panel or other structure that extends from member 46 to member 48 and/or from member 50 to bottoms of members 46, 48 or panel other structure that extends from member 52 to member 54 and/or from member 56 to bottoms of members 52, 54 so as to block the visibility of items that are stored in or on drawer 140 when drawer assembly 44 is in the latched or closed orientation.

Figure 3:
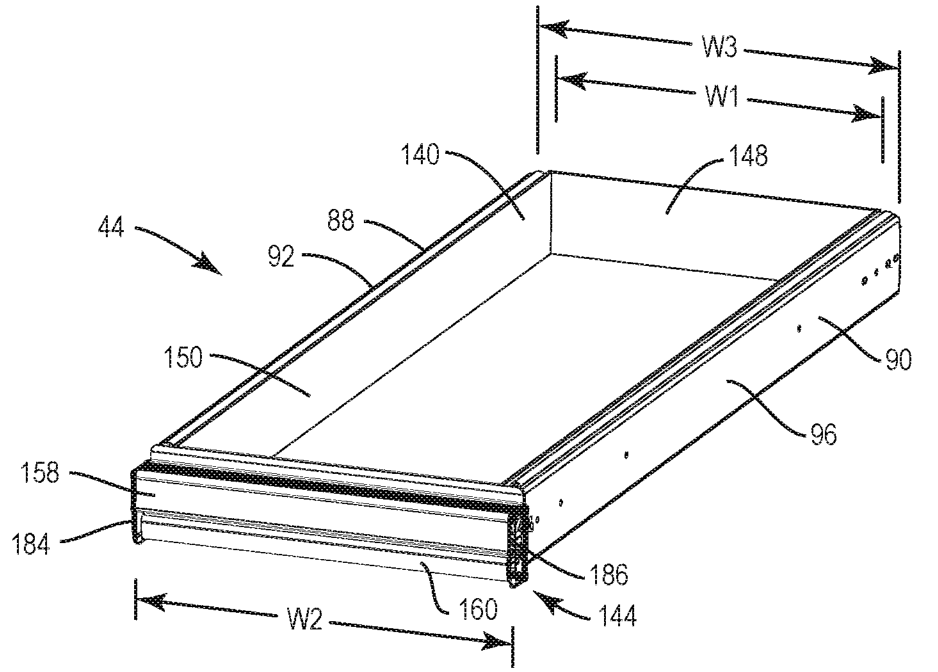
FIG. 3 is a perspective view, in part phantom, of a drawer assembly of the shelving system shown in FIG. 1.

Handle 144 includes a portion 158 that is fixed to frame 142 and a portion 160 that is rotatably coupled to portion 158. Portions 158, 160 each have a width W2 such that handle 144 also has width W2, wherein width W2 is greater than width W1 (FIG. 3). System 40 has a width W3 defined by the distance from outer surface 92 of member 88 to outer surface 96 of member 90 when members 88, 90 are coupled to frame 42. Width W2 is greater than width W3 (FIG. 3).

In some embodiments, width W2 is greater than width W3 such portion 158 directly engages an end surface 162 of member 88 and/or an end surface 164 of member 90 when drawer 140 is fully closed (pushed all the way inward relative to frame 42). That is, in some embodiments, drawer 140 is capable of being pushed inwardly relative to frame 42 until portion 158 directly engages end surface 162 and/or end surface 164. Once portion 158 directly engages end surface 162 and/or end surface 164, drawer 140 is incapable of being pushed further inward relative to frame 42.

Figure 3A:
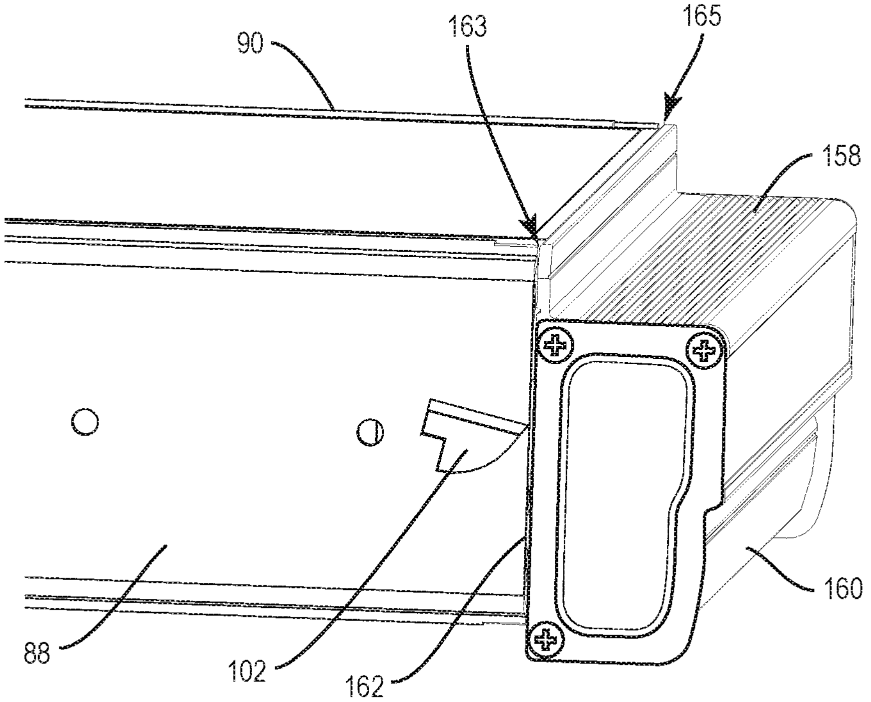
FIG. 3A is a perspective view, in part phantom, of a portion of the drawer assembly shown in FIG. 3.
Figure 4:
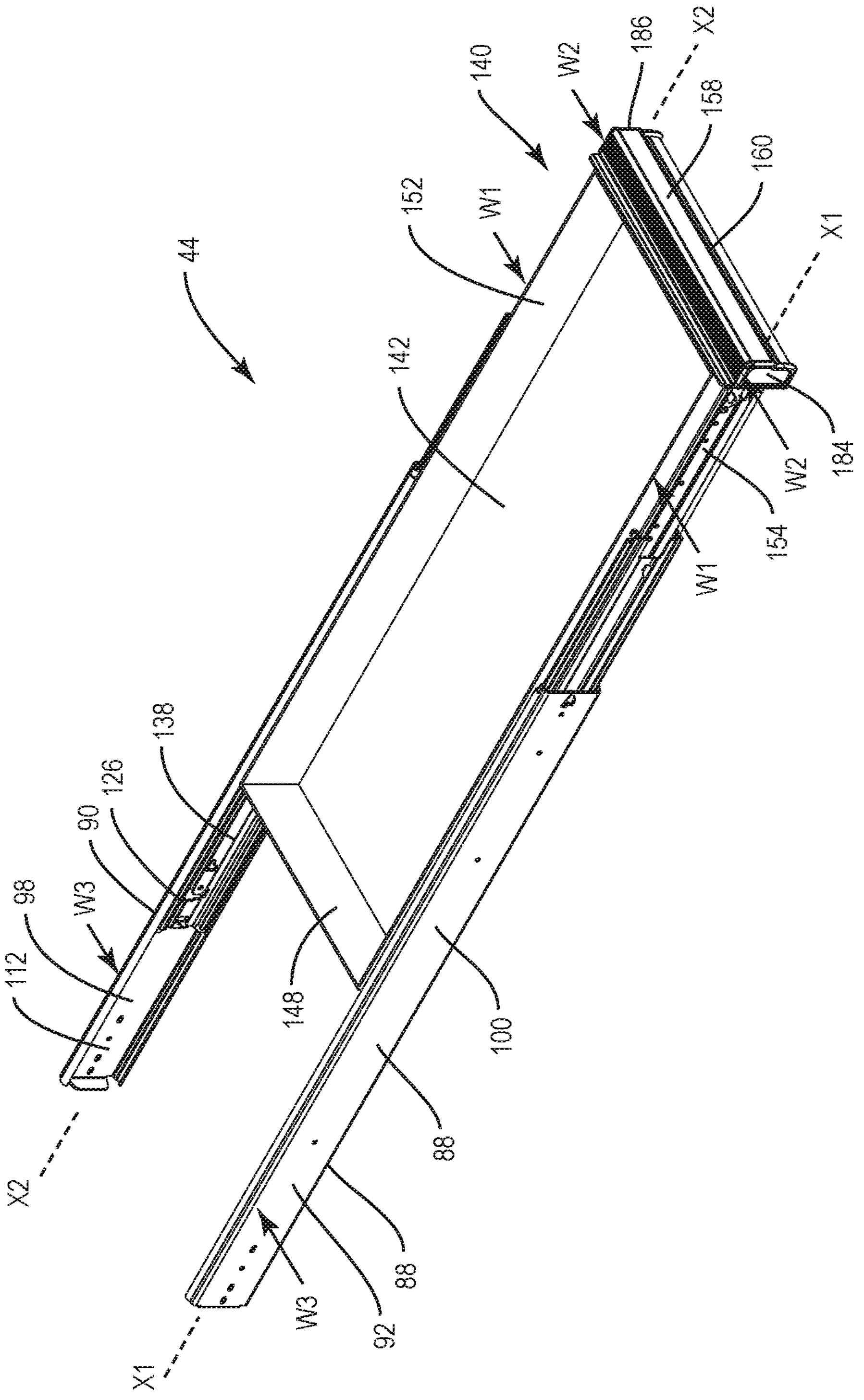
FIG. 4 is a perspective view of the drawer assembly shown in FIG. 3.
Figure 5:
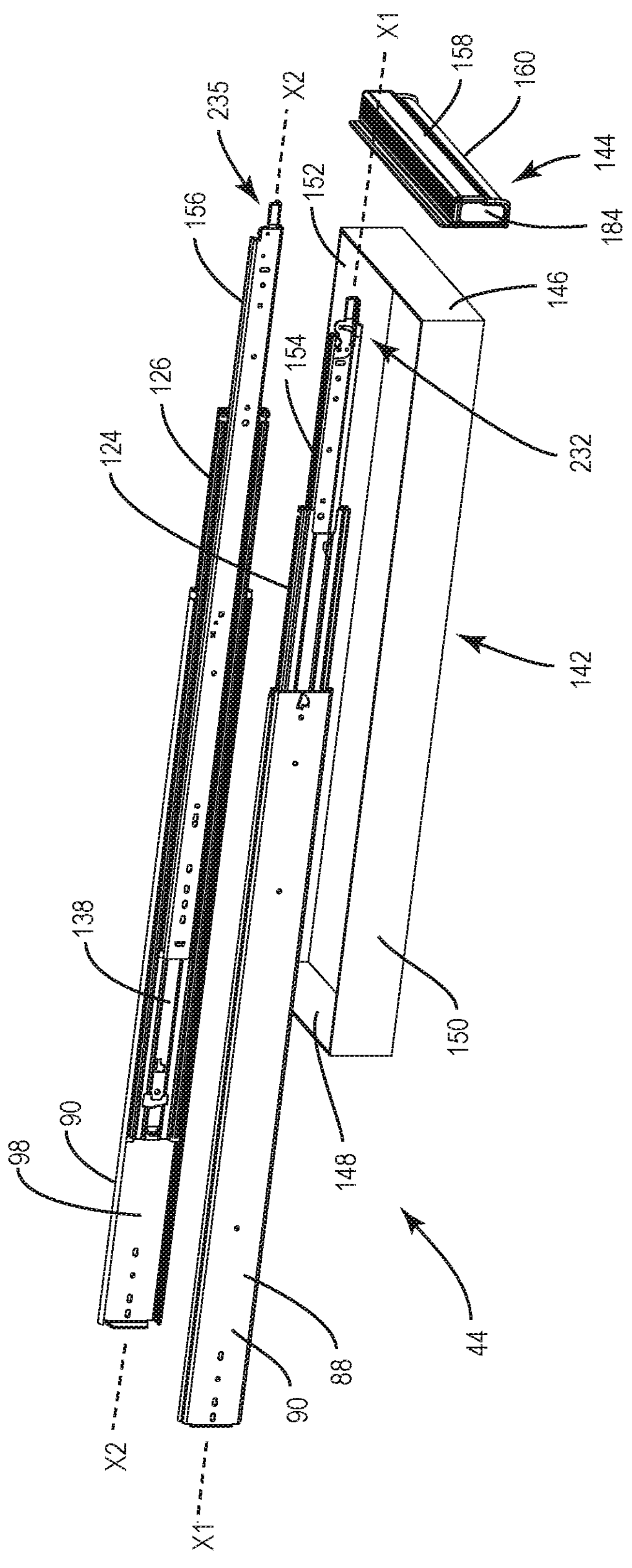
FIG. 5 is a breakaway, perspective view of the drawer assembly shown in FIG. 3.

In some embodiments, drawer assembly 44 is configured such that handle 144, including portion 158 and portion 160, is spaced apart from end surfaces 162, 164, as shown in FIG. 3A, for example. That is, portion 158 is mounted directly to end wall 146 of drawer frame 142 such that there is a gap 163 between end surface 162 and portion 158 and a gap 165 between end surface 164 and portion 158 when drawer 140 is fully closed (pushed all the way inward relative to frame 42). In some embodiments, gaps 163, 164 provide space for fastener installation. Gaps 163, 165 are present after drawer 140 has been pushed all the way inward relative to frame 42 and is prevented from being pushed any further inwardly relative to frame 42 (is fully closed). In some embodiments, gaps 163, 165 allow handle 144 to be spaced apart from frame 42 when drawer 140 is fully closed.

Figure 2:
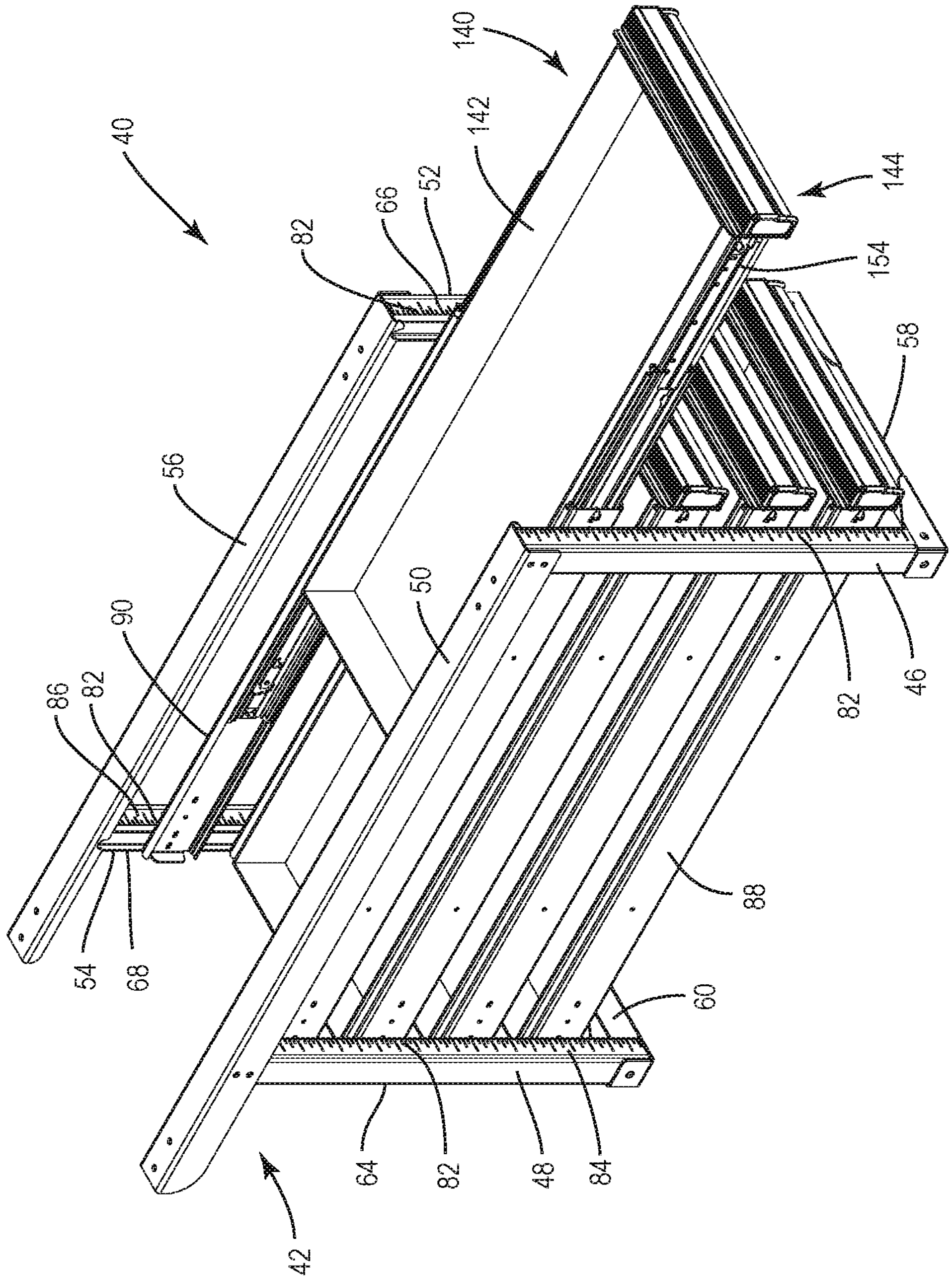
FIG. 2 is a perspective view of the shelving system shown in FIG. 1, with one of the drawer assemblies in an unlatched or open orientation.

As would be appreciated by one of ordinary skill in the art, spacing handle 144 apart from members 88, 90 when drawer 140 is fully closed reduces the likelihood of damage to handle 144 as drawer 140 is opened and closed since handle 144 will not come into contact with members 88, 90 when drawer 140 is either open or fully closed. In some embodiments, members 88, 90 are coupled to frame 42 such that flange 102 is positioned between outer surface 62 of member 46 and end surface 162 and flange 114 is positioned between outer surface 66 of member 52 and end surface 164 (FIGS. 1 and 2).

Figure 6:
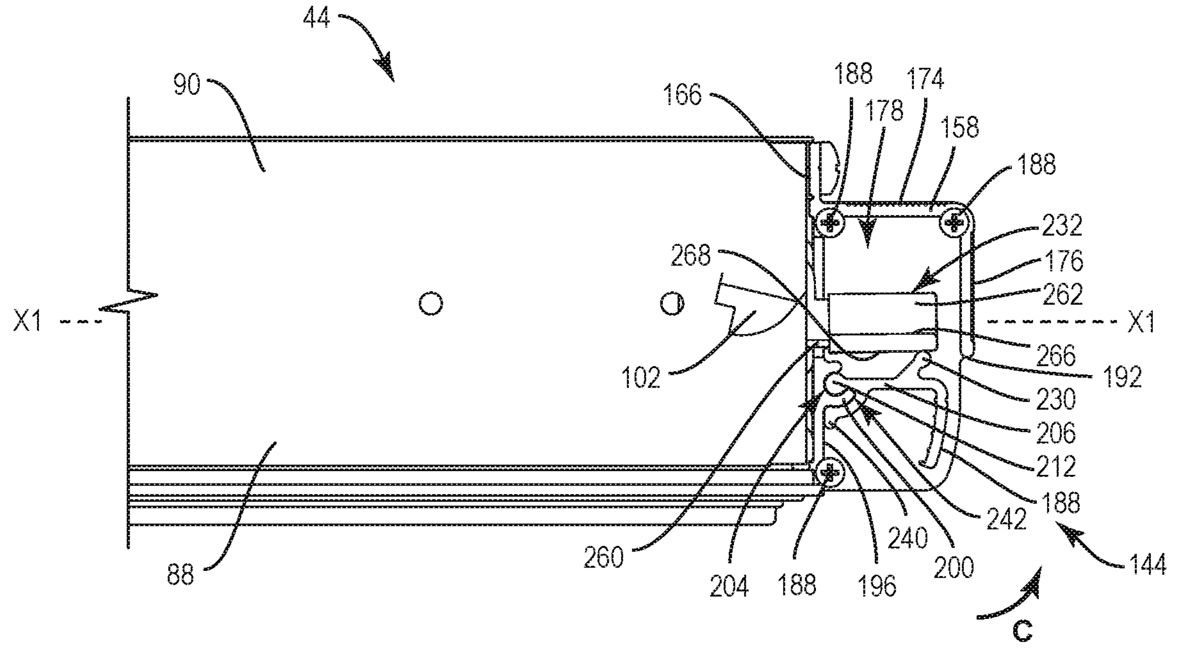
FIG. 6 is a side view, in part phantom, of a portion of the drawer assembly shown in FIG. 3, with the drawer assembly in the latched or closed orientation.
Figure 7:
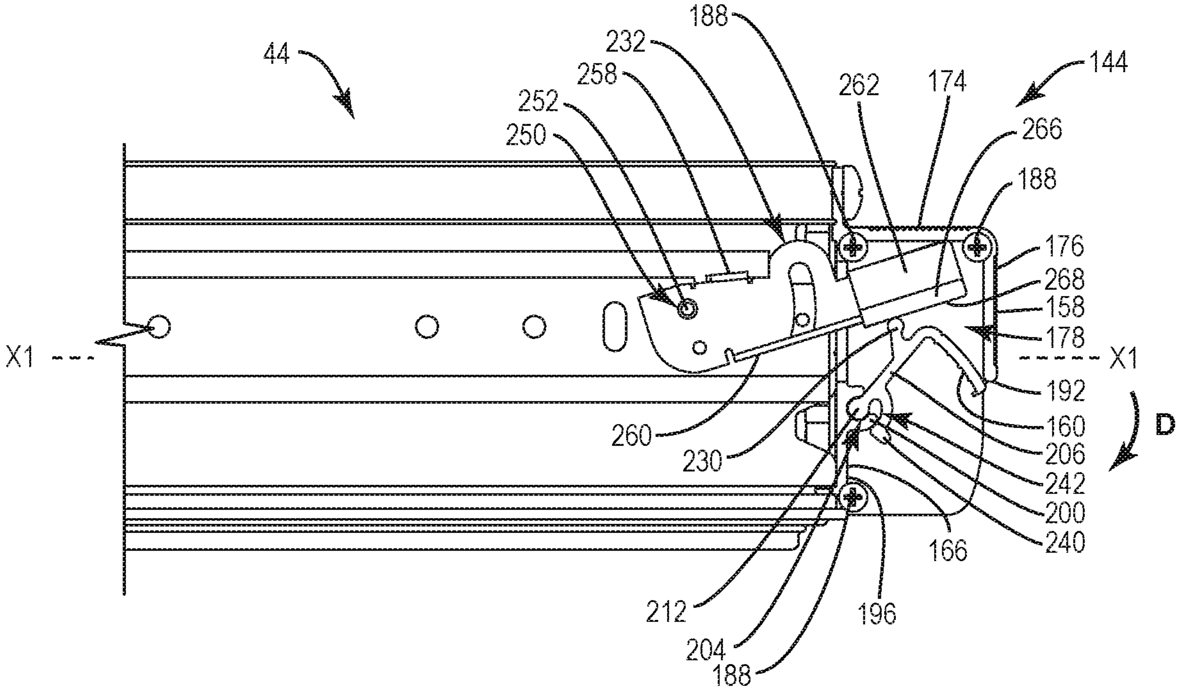
FIG. 7 is a side view, in part phantom, of a portion of the drawer assembly shown in FIG. 3, with the drawer assembly in the unlatched or open orientation.
Figure 8:
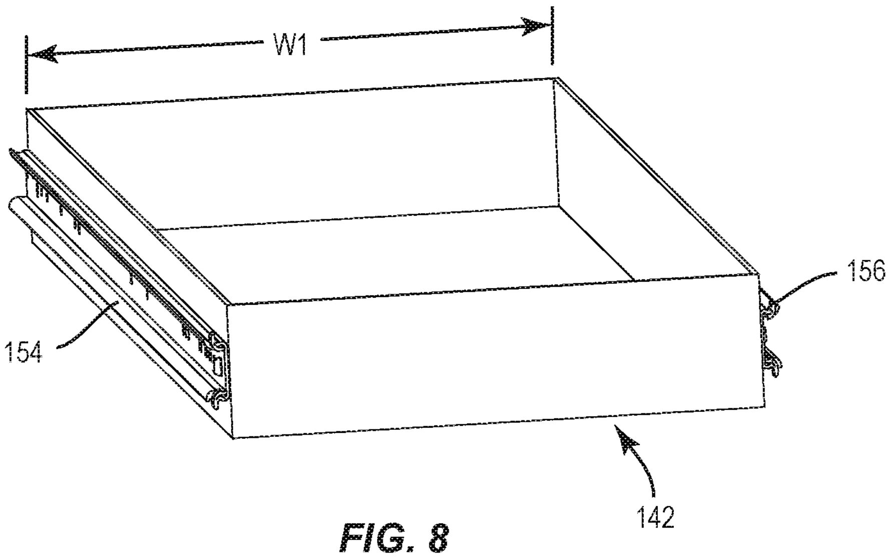
FIG. 8 is a perspective view of a component of the drawer assembly shown in FIG. 3.
Figure 9:
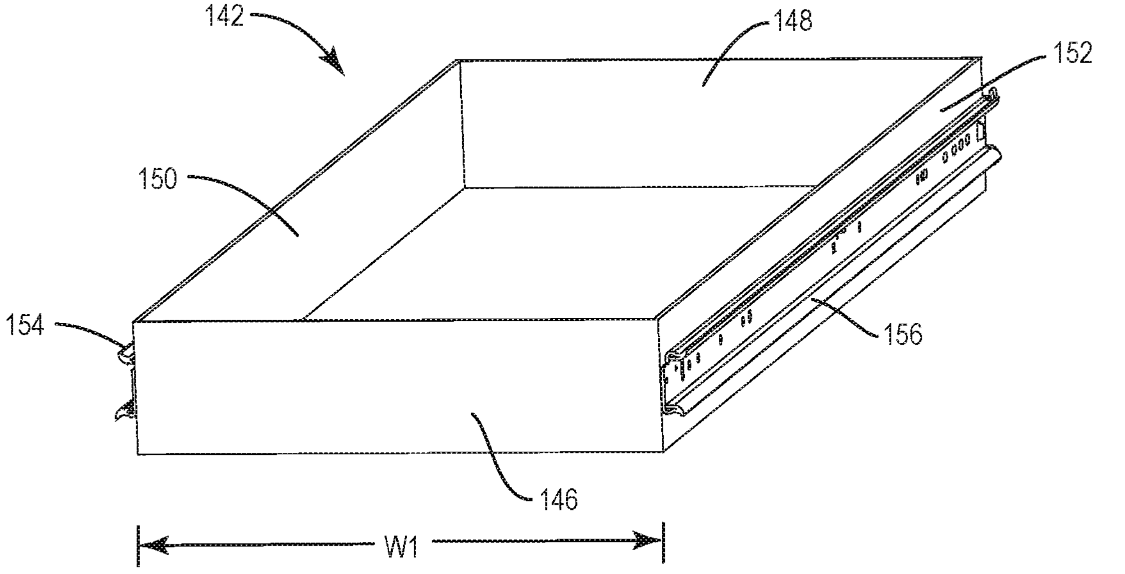
FIG. 9 is a perspective view of the component shown in FIG. 8.
Figure 10:
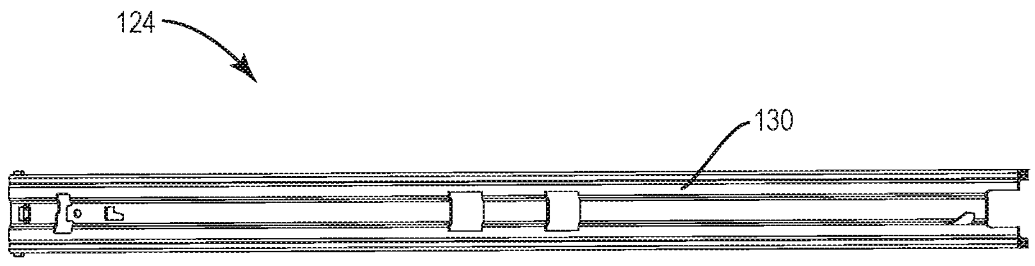
FIG. 10 is a perspective view of a component of the drawer assembly shown in FIG. 3.
Figure 11:
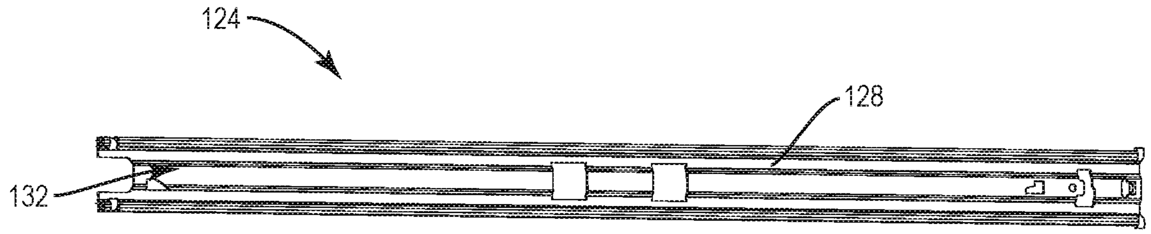
FIG. 11 is a perspective view of the component shown in FIG. 10.
Figure 12:
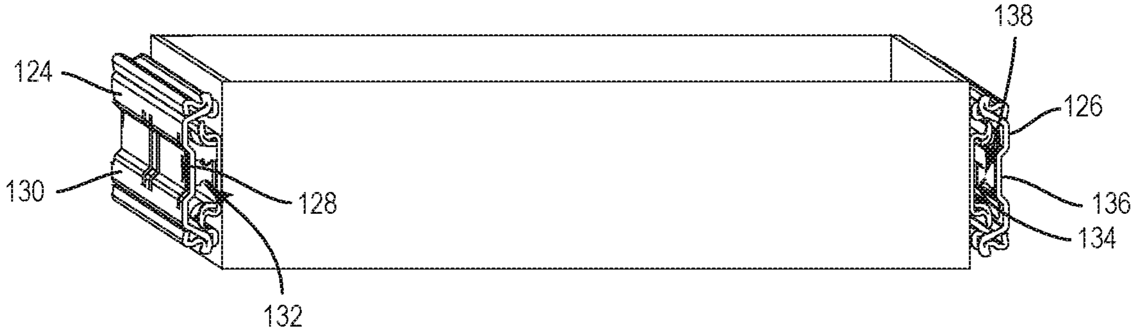
FIG. 12 is a perspective view of the component shown in FIG. 10 coupled to the component shown in FIG. 8.
Figure 13:
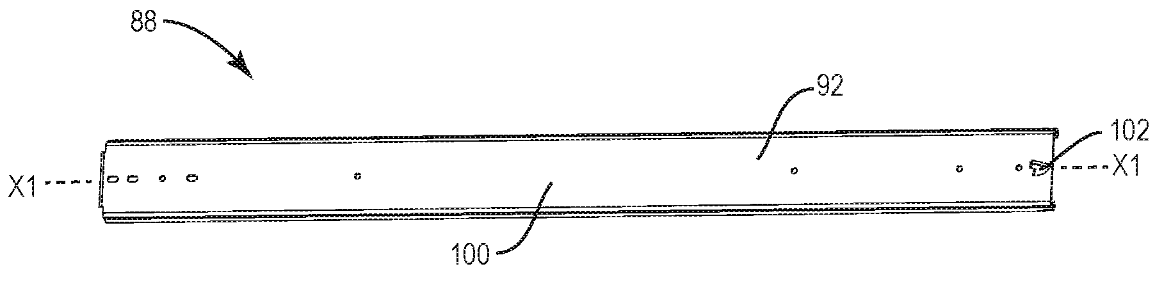
FIG. 13 is a perspective view of a component of the drawer assembly shown in FIG. 3.
Figure 14:
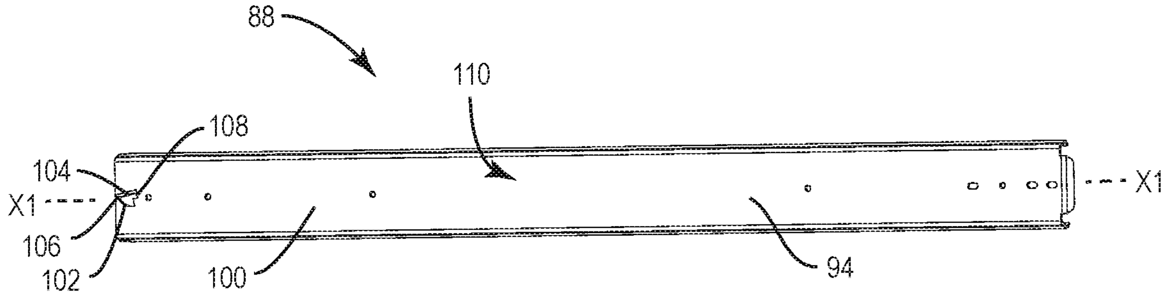
FIG. 14 is a perspective view of the component shown in FIG. 13.
Figure 20:
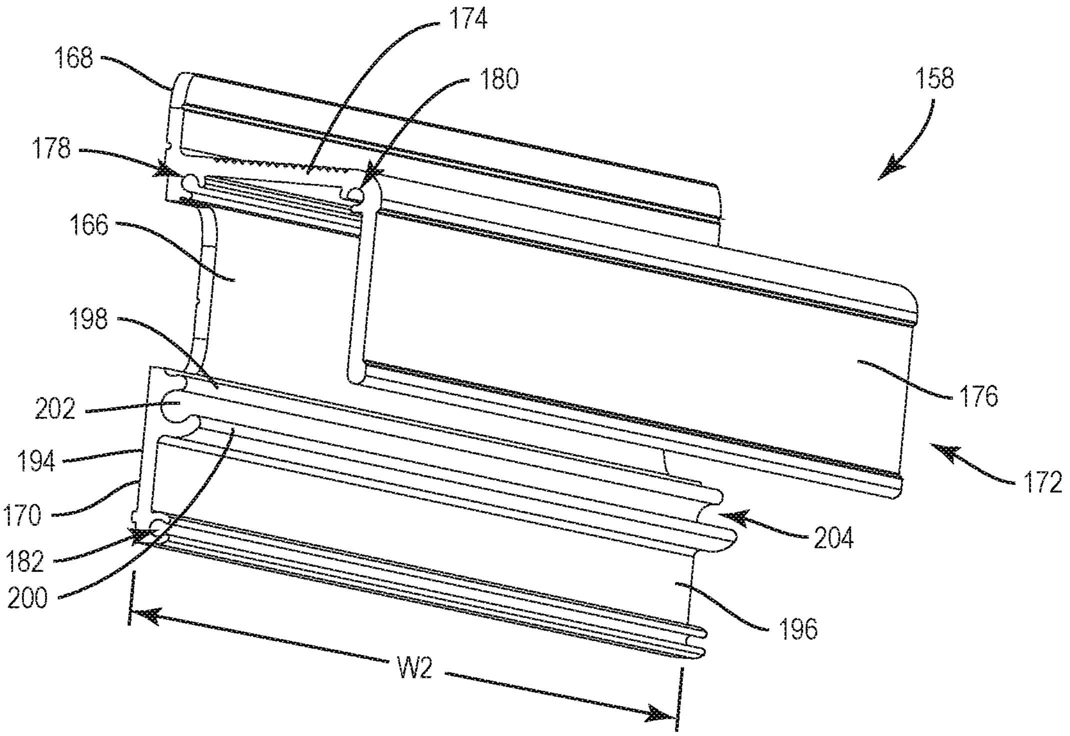
FIG. 20 is a perspective view of a component of the drawer assembly shown in FIG. 3.
Figure 21:
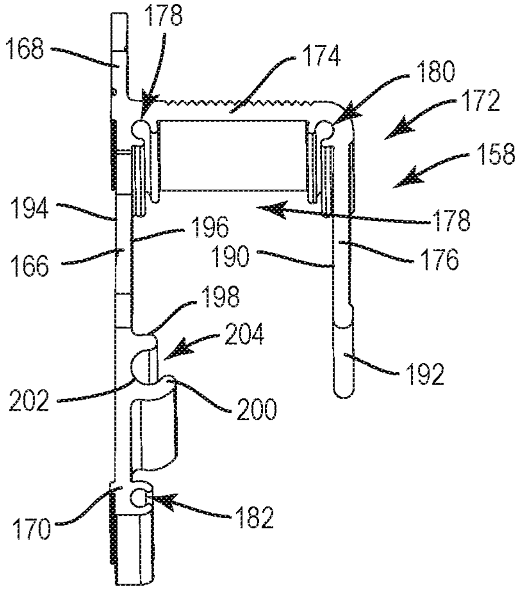
FIG. 21 is a perspective view of the component shown in FIG. 20.

Portion 158 includes a wall 166 having an end 168 and an opposite end 170, as shown in FIGS. 20 and 21, for example. Portion 158 includes an extension 172 extending from end 168. Extension 172 includes a wall 174 that extends directly from wall 166 and a wall 176 that extends from an end of wall 174. Surfaces of walls 166, 174, 176 define a cavity 175 configured for disposal of portion 160 when drawer assembly 44 in an unlatched or open orientation, as discussed herein. In some embodiments, wall 174 extends perpendicular to wall 166 and wall 176 extends parallel to wall 166. An interface between wall 166 and wall 174 defines a groove 178; an interface between wall 174 and wall 176 defines a groove 180; and end 170 defines a groove 182. Grooves 178, 180, 182 extend parallel to one another and are configured for disposal of fasteners to couple end caps 184, 186 to portion 158. For example, in some embodiments, fasteners, such as, for example, screws 188 are inserted through end cap 184 and into grooves 178, 180, 182 to couple end cap 182 to one end of handle 144 and screws 188 are inserted through end cap 186 and into grooves 178, 180, 182 to couple end cap 186 to an opposite end of handle 144. In some embodiments, at least one of grooves 178, 180, 182 extends the entire width of portion 158. In some embodiments, at least one of grooves 178, 180, 182 has a length that is equal to width W2. In some embodiments, at least one of grooves 178, 180, 182 is uniform along the entire length of portion 158. In some embodiments, at least one of grooves 178, 180, 182 has a uniform cross-sectional configuration along the entire length thereof. In some embodiments, an inner surface 190 of wall 176 is planar from groove 180 to an end surface 192 of wall 176. In some embodiments, wall 176 is free of any projections, protrusions, extensions, etc. that extend outwardly from inner surface 190 from groove 180 to end surface 192. In some embodiments, portion 160 is spaced apart from cavity 175 when drawer assembly 44 in a latched or closed orientation and is positioned within cavity 175 when drawer assembly 44 is in the unlatched or open orientation. That is, no part of portion 160 is positioned within cavity 175 when drawer assembly 44 in the latched or closed orientation, as shown in FIG. 6, and at least part of portion 160 is positioned within cavity 175 when drawer assembly 44 in the unlatched or open orientation, as shown in FIG. 7.

Wall 166 is configured to be coupled to end wall 146 of drawer 140. Wall 166 includes an inner surface 194 and an opposite outer surface 196. Portion 158 is coupled to frame 142 such that inner surface 194 directly engages end wall 146 and portion 158 is fixed relative to end wall 146. That is, inner surface 194 directly engages end wall 146 in a manner that prevents movement of portion 158 relative to frame 142. In some embodiments, inner surface 194 directly engages end wall 146 such that portion 158 cannot be removed from frame 142 without breaking and/or damaging portion 158 and/or frame 142. Wall 174 extends outwardly from outer surface 196. Portion 158 includes a rib 198 and a rib 200 that is spaced apart rib 198 by an arcuate surface 202. Ribs 198, 200 each extend outwardly from outer surface 196. That is, ribs 198, 200 each extend outwardly from wall 166, which directly engages end wall 146 of drawer 140. Arcuate surface 202 defines a passageway 204 having a length that is equal to width W2. That is, passageway 204 extends the entire width of portion 158. In some embodiments, passageway 204 is uniform along the entire length of passageway 204. In some embodiments, passageway 204 has a uniform cross-sectional configuration along the entire length of passageway 204.

Figure 22:
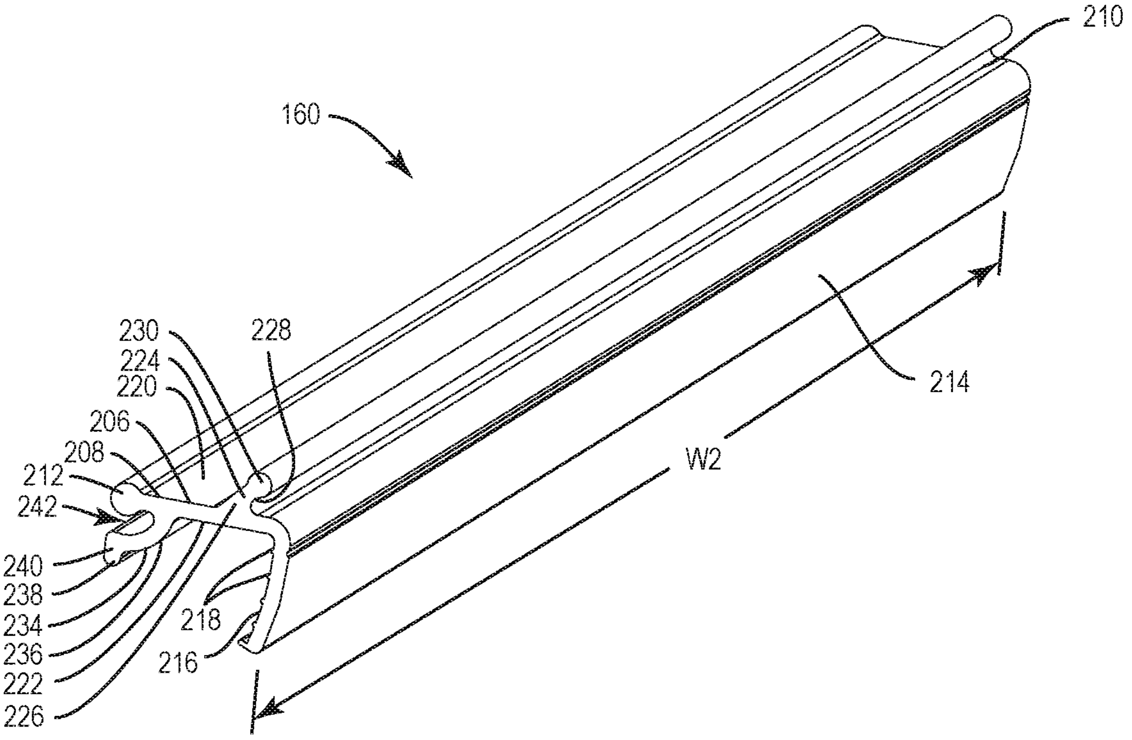
FIG. 22 is a perspective view of a component of the drawer assembly shown in FIG. 3.
Figure 23:
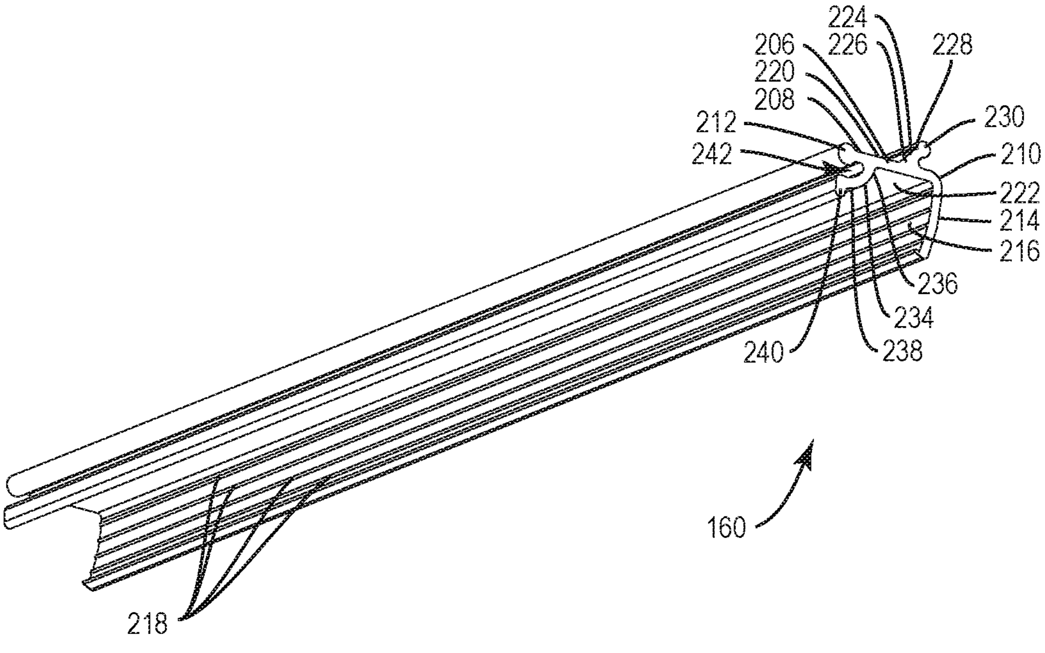
FIG. 23 is a perspective view of the component shown in FIG. 22.
Figure 24:
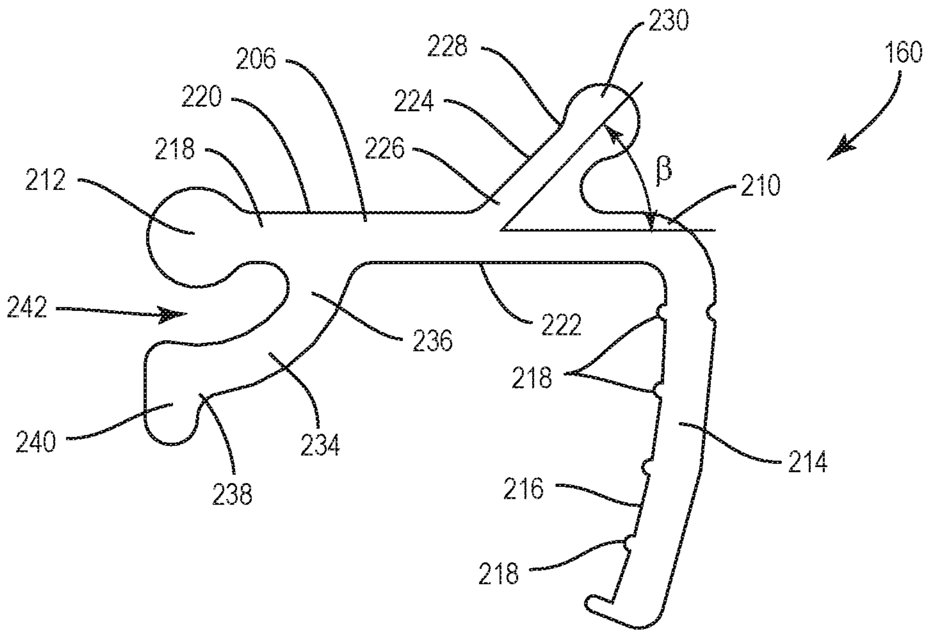
FIG. 24 is a side view of the component shown in FIG. 22.
Figure 25:
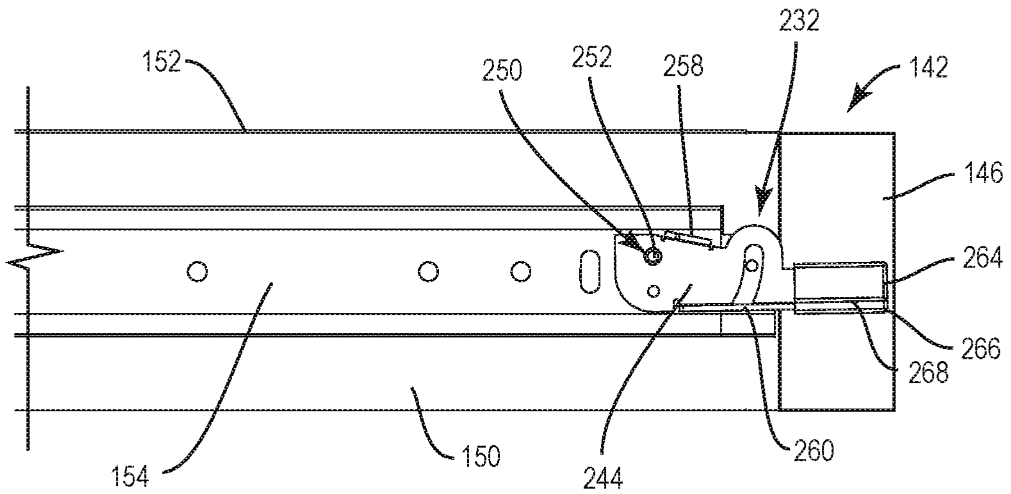
FIG. 25 is a perspective view of components of the drawer assembly shown in FIG. 3.

Portion 160 has a maximum width that is equal to a maximum width of portion 158. That is, portions 158, 160 each have width W2. Portion 160 includes a top wall 206 having an end 208 and an opposite end 210, as shown in FIGS. 22 and 23, for example. End 208 includes a bulbous portion 212 that is configured for rotatable disposal in passageway 204, as discussed herein. Portion 160 includes a front wall 214 that extends downwardly from end 210. In some embodiments, wall 214 includes an inner surface 216 and a plurality of spaced apart protrusions 218 that extend outwardly from inner surface 216. Protrusions 218 are configured to facilitate gripping of portion 160, as discussed herein. In some embodiments, protrusions 218 are arcuate and/or extend the entire width of portion 160. In some embodiments, at least one of protrusions 218 has width W2.

Wall 206 includes a top surface 220 and an opposite bottom surface 222. Portion 160 includes an extension 224 having an end 226 that extends outwardly from surface 220 and an opposite end 228 having a bulbous portion 230. Portion 230 is configured for engagement with a release lever, such as, for example, a drawer release 232 to apply an upward force to drawer release 232 to move drawer assembly 44 between the latched or closed orientation to the unlatched or open orientation, as discussed herein. Extension 224 extends at an angle relative to wall 206. In some embodiments, extension extends at an angle β relative to wall 206 (see FIG. 24). In some embodiments, extension extends at angle β relative to top surface 220 and/or bottom surface 222 of wall 206. In some embodiments, angle β is an acute angle. In some embodiments, angle β is an angle between about 1 degree and about 65 degrees. In some embodiments, angle β is an angle between about 10 degrees and about 65 degrees. In some embodiments, angle β is an angle between about 10 degrees and about 55 degrees. In some embodiments, angle β is an angle between about 20 degrees and about 55 degrees. In some embodiments, angle β is an angle between about 30 degrees and about 55 degrees. In some embodiments, angle β is an angle between about 40 degrees and about 55 degrees. Portion 230 is monolithically and/or integrally formed with other parts of portion 160, such as, for example, wall 214 such that portion 230 cannot be removed or separated from wall 214 without breaking or damaging portion 230 and/or wall 214. As such, the component (portion 160) of handle 144 that is moved relative to portion 158 is the same component that applies an upward force on drawer releases to move drawer assembly 44 between the latched or closed orientation and the unlatched or open orientation, as discussed herein.

Portion 160 includes an extension 234 having an end 236 that extends outwardly from surface 222 and an opposite end 238 having an enlarged portion 240. Portion 230 is configured for engagement with drawer release 232 and a drawer release 235 to apply an upward force to drawer releases 232, 235 to move drawer assembly 44 between the latched or closed orientation and the unlatched or open orientation, as discussed herein. Surfaces of portion 212 and extension 234 define an arcuate passage 242 configured for movable disposal of rib 200 as drawer assembly 44 between the latched or closed orientation and the unlatched or open orientation, as discussed herein. In some embodiments, extension 234 and/or passage 242 is/are continuously curved from end 236 to end 238. In some embodiments, portion 212, passage 240 and extensions 224, 234 each extend the entire width of portion 158. That is, portion 212, passage 240 and extensions 224, 234 each have width W2. In some embodiments, portion 212, passage 240 and extensions 224, 234 are each uniform along the entire width of portion 158. In some embodiments, portion 240 directly engages surface 196 of portion 158 when drawer assembly 44 in a latched or closed orientation, as shown in FIG. 6, and is spaced apart from portion 158 when drawer assembly 44 is in the unlatched or open orientation, as shown in FIG. 7. In some embodiments, portion 160 is not in contact with any biasing elements, such as, for example, springs that apply a force to portion 160 when drawer assembly 44 in a latched or closed orientation or when drawer assembly 44 is in the unlatched or open orientation.

Figure 26:
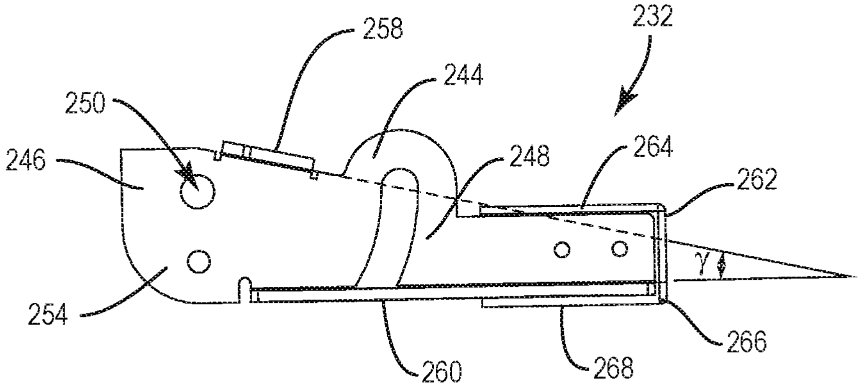
FIG. 26 is a perspective view of a component of the drawer assembly shown in FIG. 3.
Figure 27:
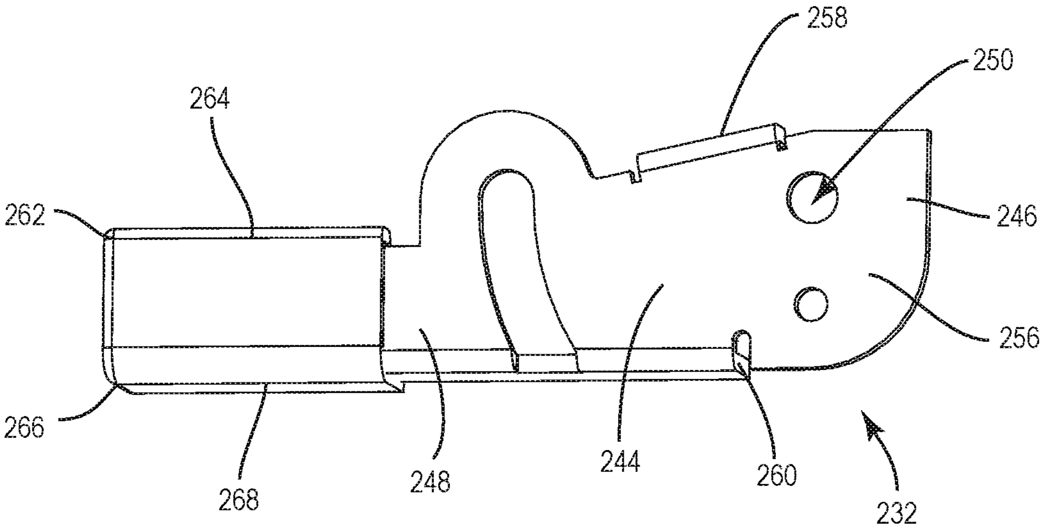
FIG. 27 is a perspective view of the component shown in FIG. 26.
Figure 28:
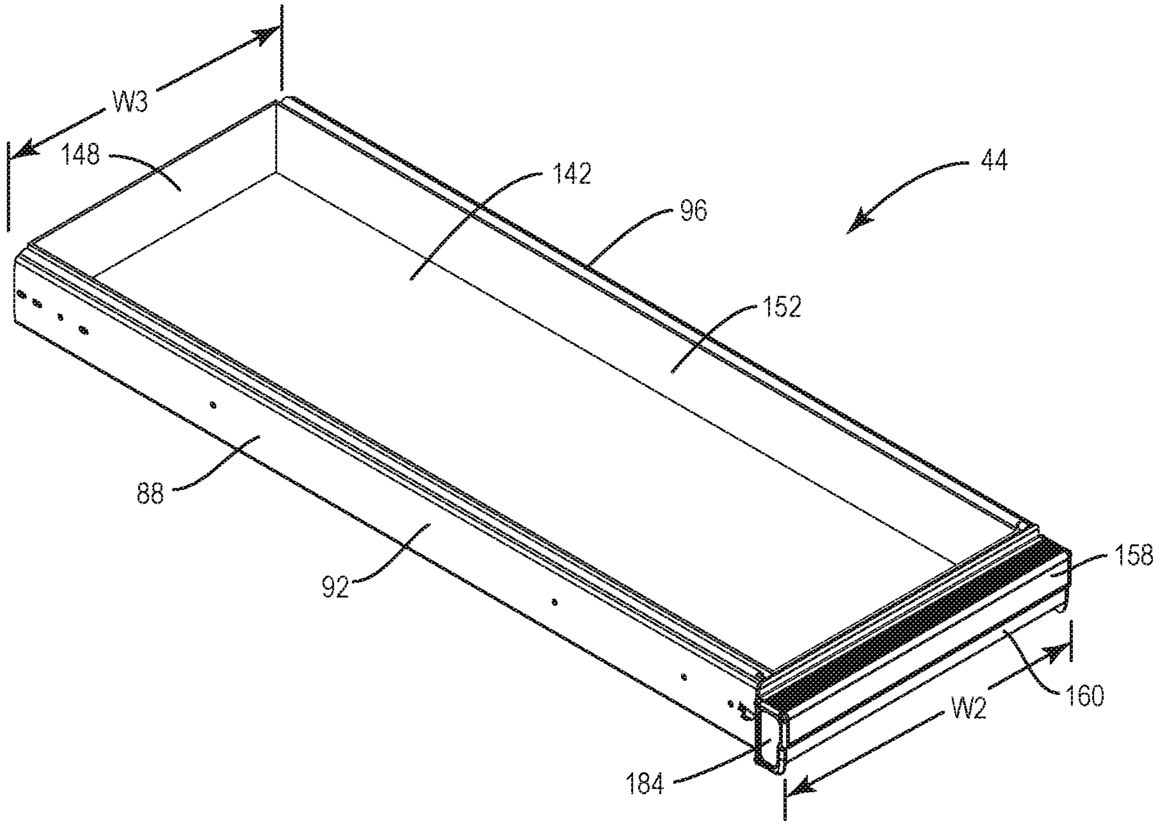
FIG. 28 is a perspective view, in part phantom, of the drawer assembly shown in FIG. 3, with the drawer assembly in the latched or closed orientation.
Figure 29:
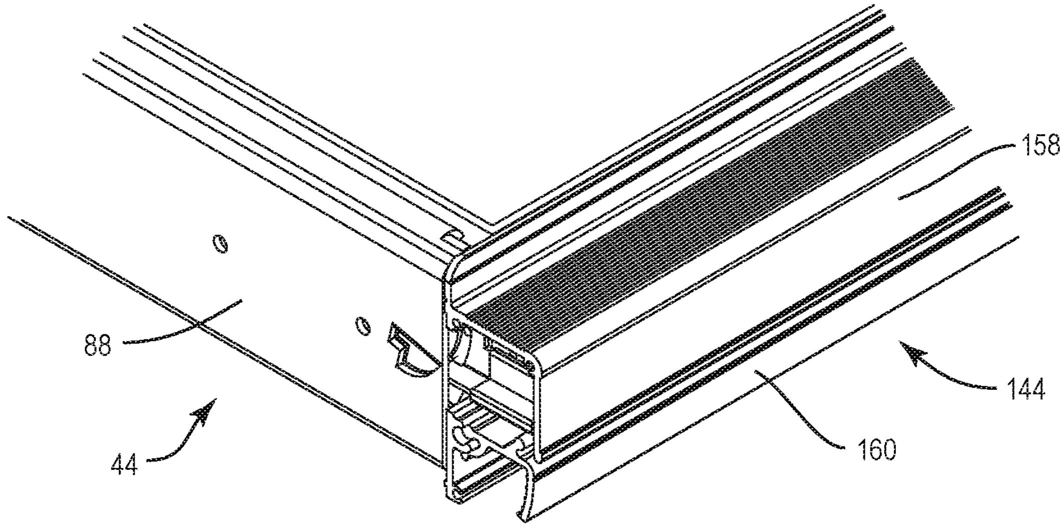
FIG. 29 is a perspective view of a portion of the drawer assembly shown in FIG. 3, with the drawer assembly in the latched or closed orientation.

Drawer release 232 is coupled to drawer 140 such that a portion of drawer release 232 is positioned in a channel of rail 154 and drawer release 232 is rotatable relative to rail 154 and frame 142. Drawer release 232 includes a body, such as, for example, a plate 244 having an end 246 and an opposite end 248, as shown in FIGS. 26 and 27, for example. End 248 is fixed relative to end 246. In some embodiments, plate 244 is monolithically and/or integrally formed. Drawer release 232 includes an opening 250 that extends through a thickness of plate 244. In some embodiments, a fastener, such as, for example, a rivet 252 extends through opening 250 and into rail 154 and/or sidewall 150 such that plate 244 is rotatable relative to rail 154 and sidewall 150 about rivet 252.

Plate 244 includes a side 254 and an opposite side 256. Drawer release 232 includes a flange 258 that extends outwardly from side 254 at a top portion of plate 244 and a flange 260 that extends outwardly from side 254 at a bottom portion of plate 244. Flange 258 defines a locking element configured to engage and disengage a locking element, such as, for example, flange 102 of member 88 to move drawer assembly 44 between the latched or closed orientation and the unlatched or open orientation, as discussed herein. In some embodiments, flange 260 is non-parallel with flange 258. In some embodiments, flange 260 extends at an angle relative to flange 258. In some embodiments, flange 260 extends at an angle γ relative to flange 258. In some embodiments, angle γ is an angle. In some embodiments, angle γ is an angle between about 1 degree and about 65 degrees. In some embodiments, angle γ is an angle between about 10 degrees and about 65 degrees. In some embodiments, angle γ is an angle between about 10 degrees and about 55 degrees. In some embodiments, angle γ is an angle between about 10 degrees and about 45 degrees. In some embodiments, angle γ is an angle between about 20 degrees and about 30 degrees. In some embodiments, side 254 extends parallel to side 256 and at least one of flanges 258, 260 extend perpendicular to sides 254 and side 256.

In some embodiments, drawer release 232 includes an optional sleeve 262 having a section 264 positioned over a portion of end 248 and a section 266 positioned over a portion of flange 260. Section 266 is configured for direct engagement with portion 230 of extension 224 by lifting portion 160 such that extension 224 contacts a bottom surface of section 266 (or a bottom surface of flange 260 when sleeve 262 is omitted) to apply an upward force to flange 260 to move drawer assembly 44 from the latched or closed orientation to the unlatched or open orientation, as discussed herein. In some embodiments, sleeve 262 may be made at least in part from a material, such as, for example, plastic or an elastomeric material to enhance gripping of portion 230 with sleeve 262.

Figure 30:
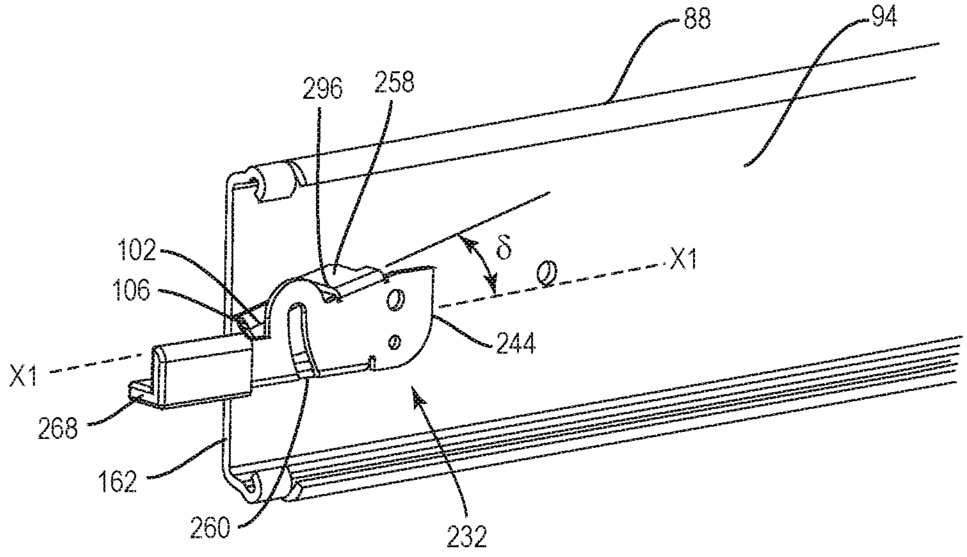
FIG. 30 is a perspective view showing the orientation of components of the drawer assembly shown in FIG. 3 when the drawer assembly in the latched or closed orientation.
Figure 30A:
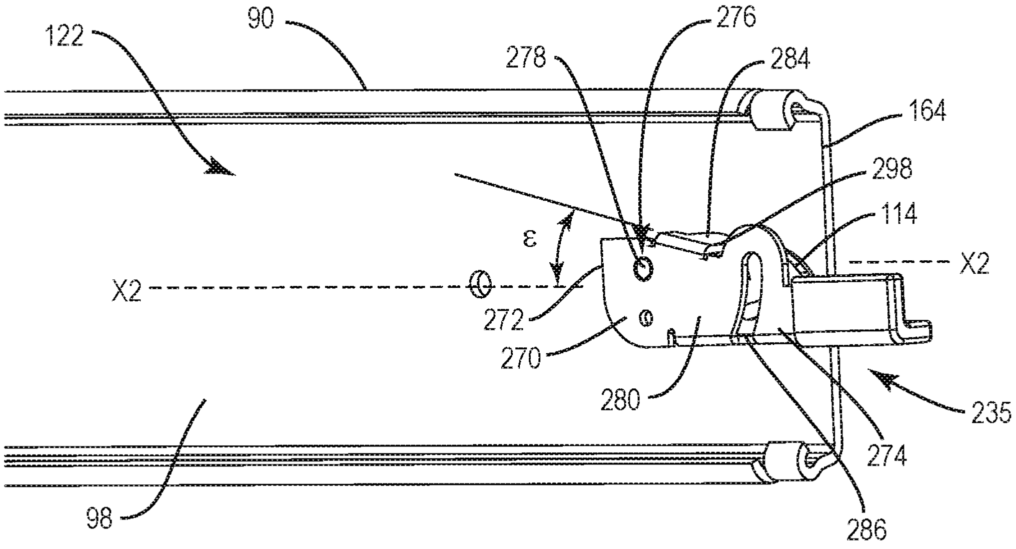
FIG. 30A is a perspective view showing the orientation of components of the drawer assembly shown in FIG. 3 when the drawer assembly in the latched or closed orientation.

Drawer release 235 is coupled to drawer 140 such that a portion of drawer release 235 is positioned in a channel of rail 156 and drawer release 235 is rotatable relative to rail 156 and frame 142. Drawer release 235 includes a body, such as, for example, a plate 270 having an end 272 and an opposite end 274, as shown in FIGS. 30A and 31A, for example. End 274 is fixed relative to end 272. In some embodiments, plate 270 is monolithically and/or integrally formed. Drawer release 235 includes an opening 276 that extends through a thickness of plate 270. In some embodiments, a fastener, such as, for example, a rivet 278 extends through opening 276 and into rail 156 and/or sidewall 152 such that plate 270 is rotatable relative to rail 156 and sidewall 152 about rivet 278.

Plate 270 includes a side 280 and an opposite side 282. Drawer release 235 includes a flange 284 that extends outwardly from side 282 at a top portion of plate 270 and a flange 286 that extends outwardly from side 282 at a bottom portion of plate 270. Flange 284 defines a locking element configured to engage and disengage a locking element, such as, for example, flange 114 of member 90 to move drawer assembly 44 between the latched or closed orientation and the unlatched or open orientation, as discussed herein. In some embodiments, flange 286 is non-parallel with flange 284. In some embodiments, flange 286 extends at an angle relative to flange 284. In some embodiments, flange 286 extends at an acute angle relative to flange 258. In some embodiments, flange 286 extends at angle γ relative to flange 284. In some embodiments, drawer release 235 is structurally identical to drawer release 232.

In some embodiments, drawer release 235 includes an optional sleeve 288 having a section 290 positioned over a portion of end 274 and a section 292 positioned over a portion of flange 286. Section 292 is configured for direct engagement with portion 230 of extension 224 by lifting portion 160 such that extension 224 contacts a bottom surface of section 266 (or a bottom surface of flange 286 when sleeve 288 is omitted) to apply an upward force to flange 286 to move drawer assembly 44 from the latched or closed orientation to the unlatched or open orientation, as discussed herein. In some embodiments, sleeve 288 may be made at least in part from a material, such as, for example, an elastomeric material to enhance gripping of portion 230 with sleeve 288.

Portion 160 is coupled to portion 158 such that portion 212 is positioned in passageway 204 and at least a portion of rib 200 is positioned in passage 242. When portion 212 is positioned in passageway 204 and at least a portion of rib 200 is positioned in passage 242, portion 230 directly engages a bottom surface 268 of section 266 of sleeve 262 (or a bottom surface of flange 260 when sleeve 262 is omitted), as shown in FIGS. 6 and 7, for example, and portion 230 simultaneously directly engages a bottom surface 294 of section 292 of sleeve 288 (or a bottom surface of flange 286 when sleeve 288 is omitted). Portion 230 directly engages bottom surface 268 of section 266 of sleeve 262 (or the bottom surface of flange 260 when sleeve 262 is omitted) when drawer assembly 44 is in the latched or closed orientation, as shown in FIG. 6, and when drawer assembly 44 is in the unlatched or open orientation, as shown in FIG. 7. That is, portion 230 remains directly engaged with bottom surface 268 of section 266 of sleeve 262 (or the bottom surface of flange 260 when sleeve 262 is omitted) as drawer assembly 44 moves back and forth between the latched or closed orientation and the unlatched or open orientation.

Drawer assembly 44 is biased to the latched or closed orientation to prevent movement of drawer 140 relative to members 88, 90, as discussed herein. In particular, when drawer assembly 44 is in the latched or closed orientation, portion 230 directly engages bottom surface 268 of section 266 of sleeve 262 (or a bottom surface of flange 260 when sleeve 262 is omitted) such that wall 206, flange 260 and bottom surface 268 of section 266 each extend parallel to axis X1. Likewise, when drawer assembly 44 is in the latched or closed orientation, portion 230 directly engages bottom surface 294 of section 292 of sleeve 288 (or a bottom surface of flange 286 when sleeve 288 is omitted) such that wall 206, flange 286 and bottom surface 294 of section 292 each extend parallel to axis X2. When drawer assembly 44 is the latched or closed orientation, wall 214 of portion 160 is spaced apart from end surface 192 of wall 176 of portion 158, sleeve 262 (or flange 260 when sleeve 262 is omitted) is spaced apart from wall 174 and sleeve 288 (or flange 286 when sleeve 288 is omitted) is spaced apart from wall 174.

Figure 31:
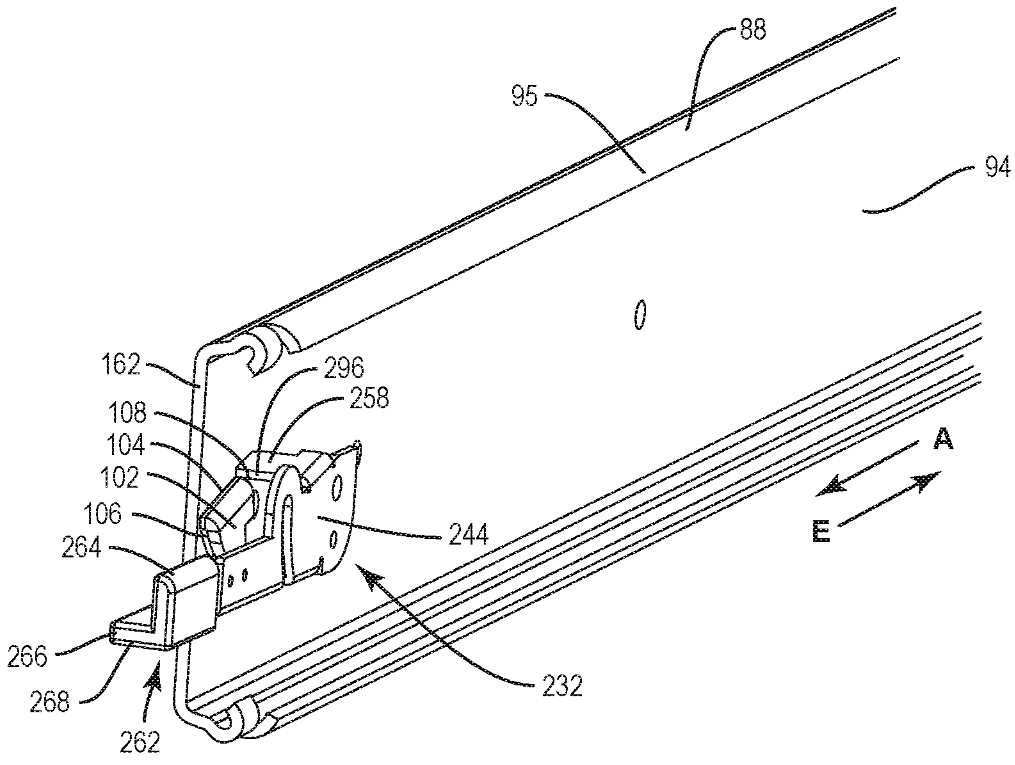
FIG. 31 is a perspective view showing the orientation of components of the drawer assembly shown in FIG. 3 when the drawer assembly in the latched or closed orientation.
Figure 31A:
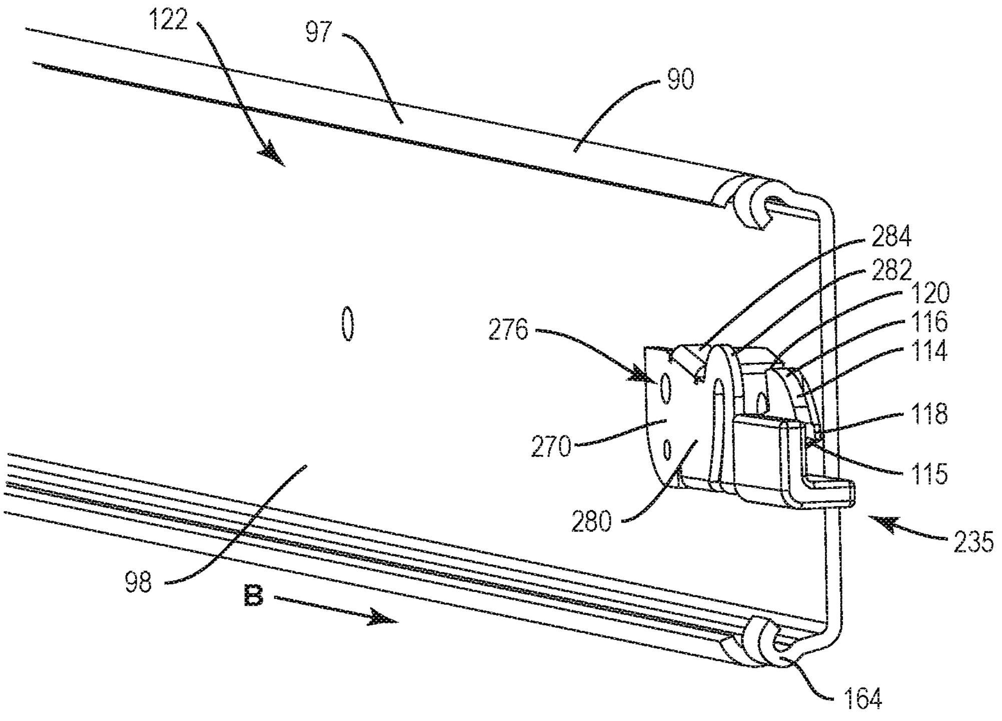
FIG. 31A is a perspective view showing the orientation of components of the drawer assembly shown in FIG. 3 when the drawer assembly in the latched or closed orientation.
Figure 32:
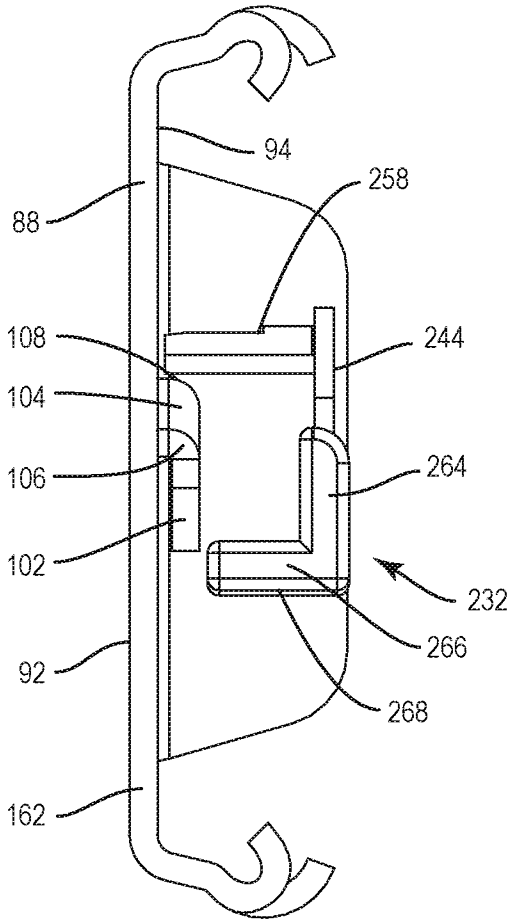
FIG. 32 is an end view showing the orientation of components of the drawer assembly shown in FIG. 3 when the drawer assembly in the latched or closed orientation.
Figure 32A:
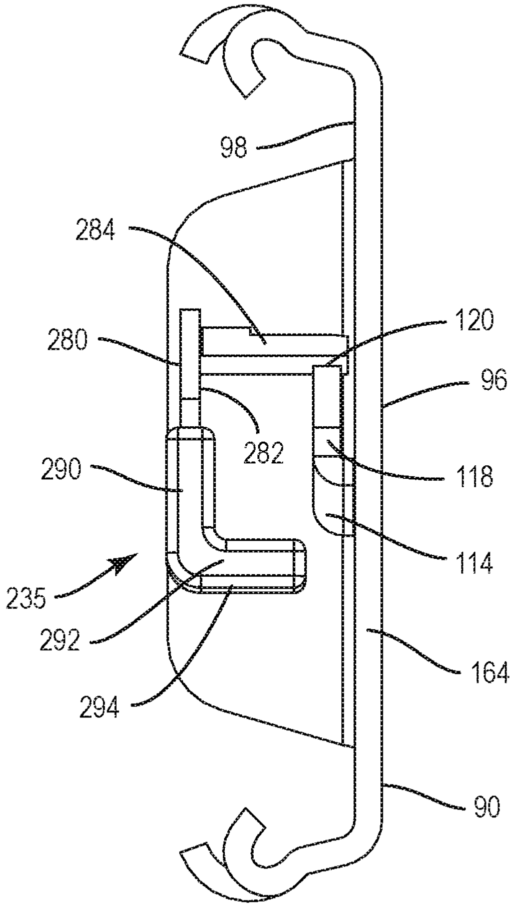
FIG. 32A is an end view showing the orientation of components of the drawer assembly shown in FIG. 3 when the drawer assembly in the latched or closed orientation.
Figure 33:
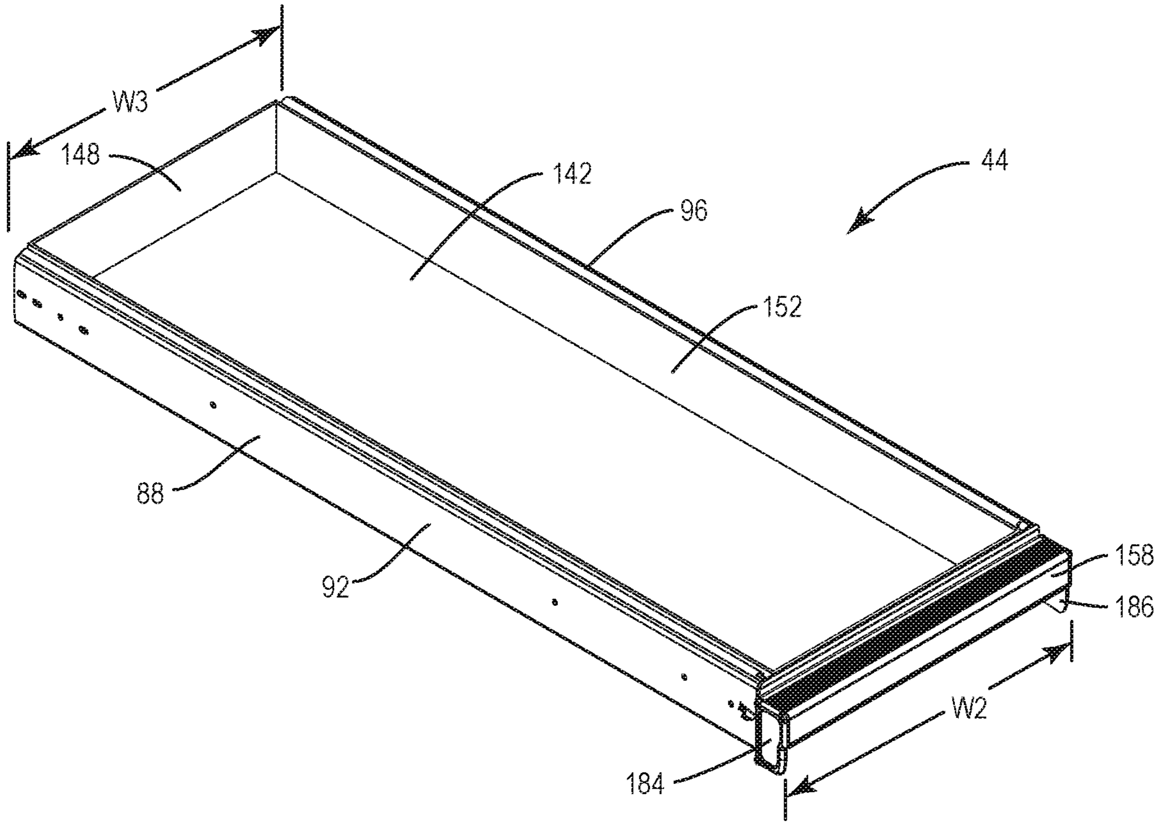
FIG. 33 is a perspective view, in part phantom, of the drawer assembly shown in FIG. 3, with the drawer assembly in the unlatched or open orientation.
Figure 34:
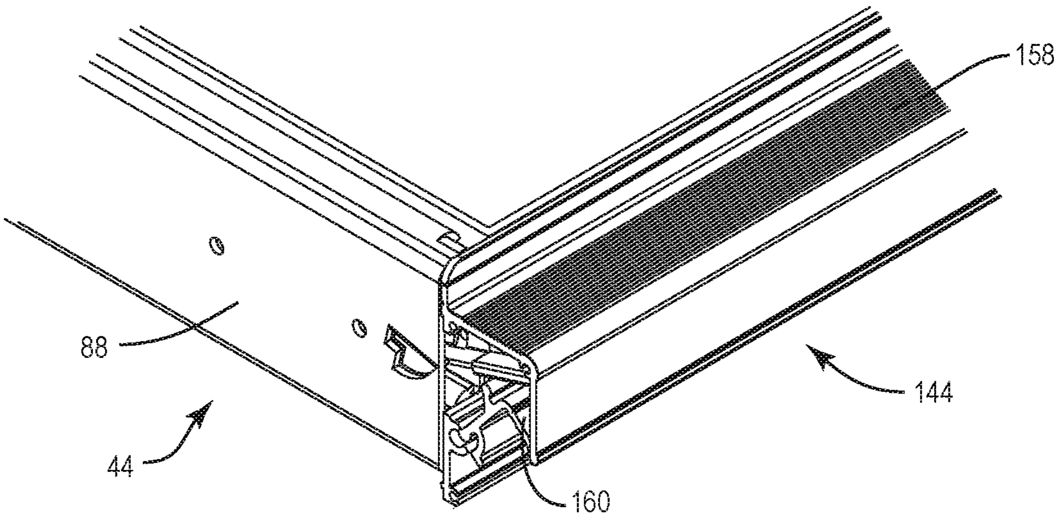
FIG. 34 is a perspective view of a portion of the drawer assembly shown in FIG. 3, with the drawer assembly in the unlatched or open orientation.
Figure 35:
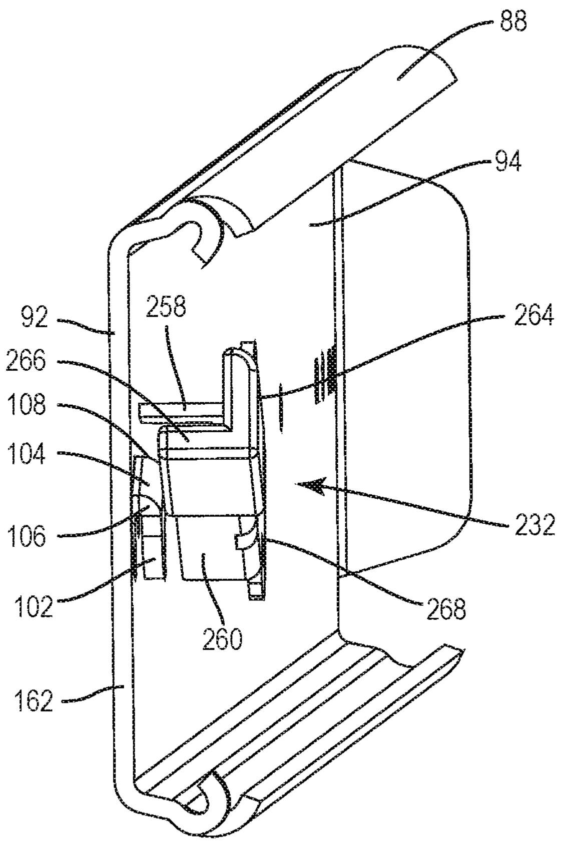
FIG. 35 is a perspective view showing the orientation of components of the drawer assembly shown in FIG. 3 when the drawer assembly in the unlatched or open orientation.
Figure 35A:
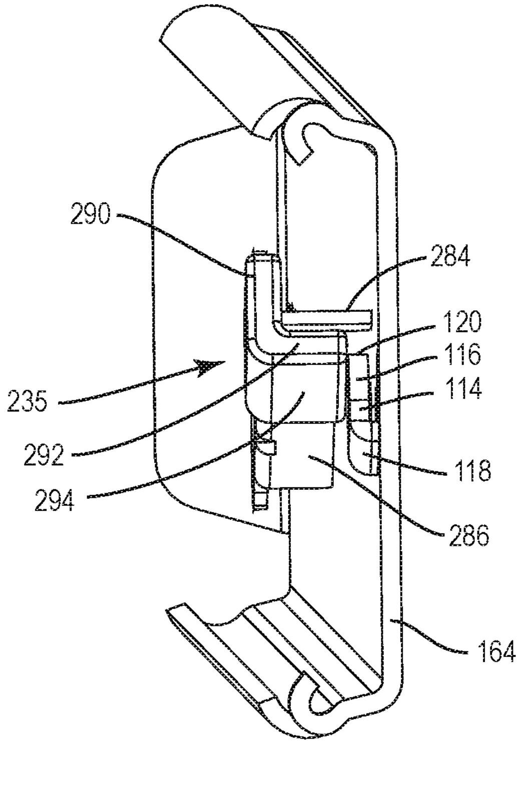
FIG. 35A is a perspective view showing the orientation of components of the drawer assembly shown in FIG. 3 when the drawer assembly in the unlatched or open orientation.
Figure 36:
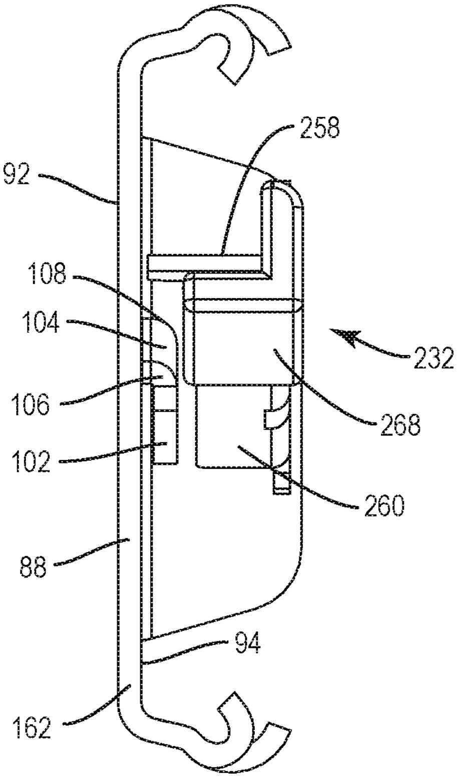
FIG. 36 is an end view showing the orientation of components of the drawer assembly shown in FIG. 3 when the drawer assembly in the unlatched or open orientation.
Figure 36A:
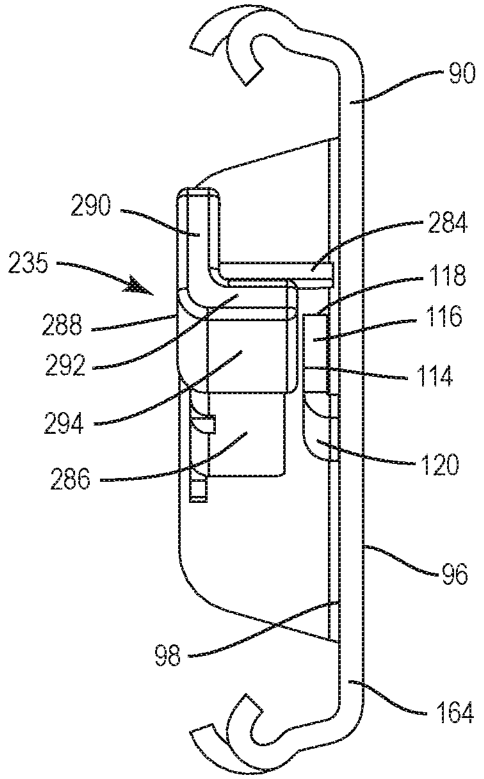
FIG. 36A is an end view showing the orientation of components of the drawer assembly shown in FIG. 3 when the drawer assembly in the unlatched or open orientation.
Figure 37:
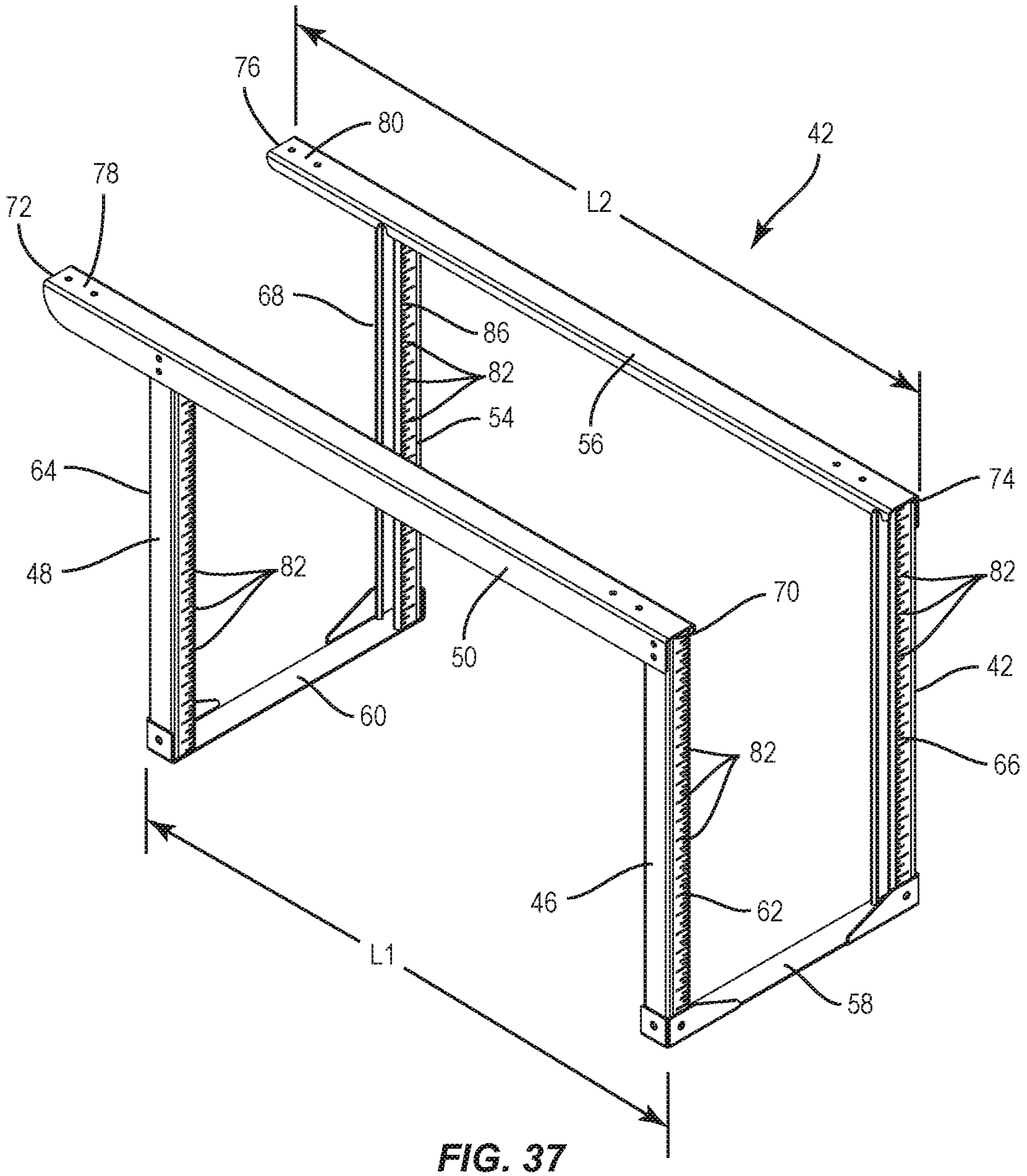
FIG. 37 is a perspective view of one embodiment of a component of the shelving system shown in FIG. 1.
Figure 38:
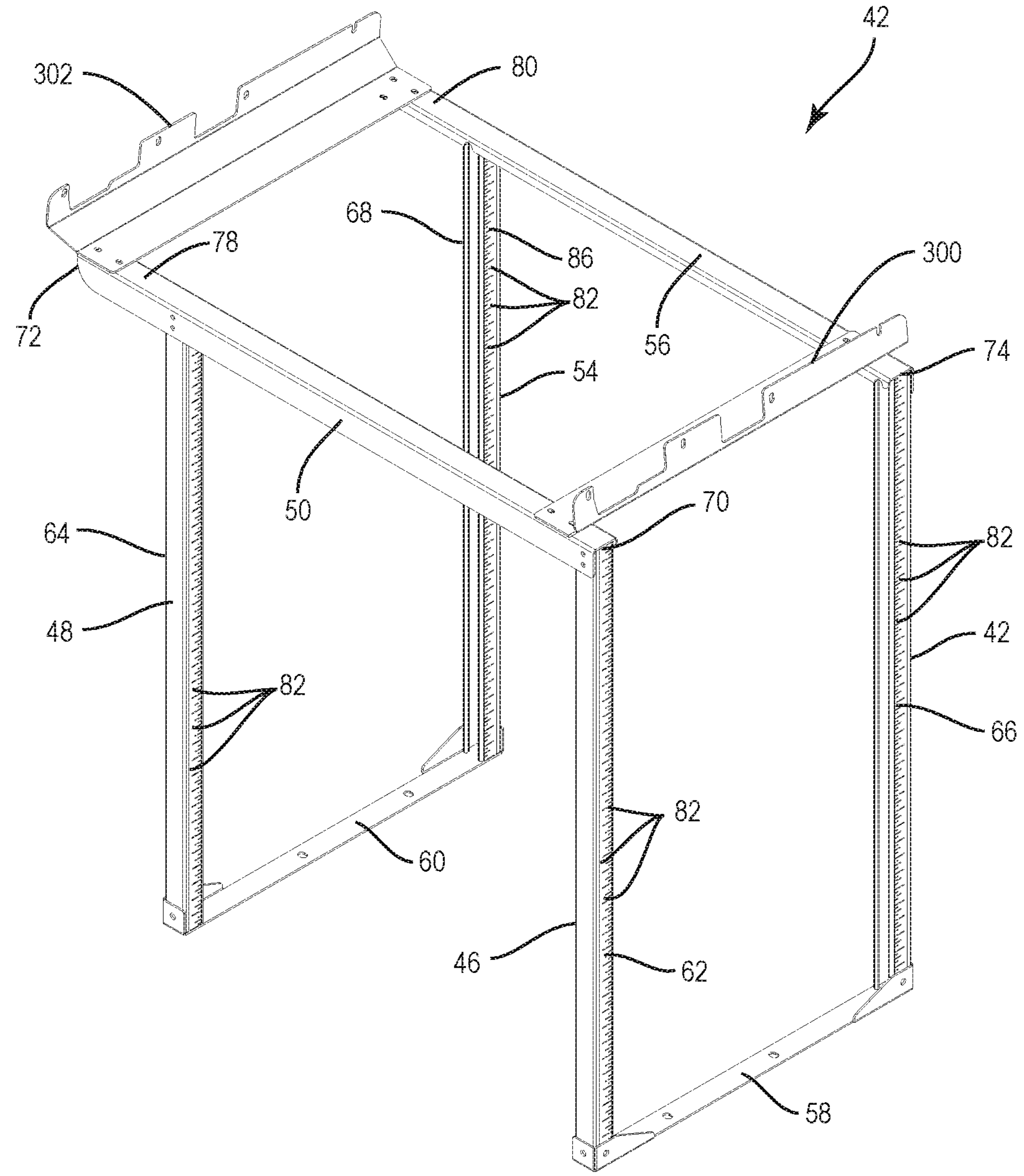
FIG. 38 is a perspective view of one embodiment of a component of the shelving system shown in FIG. 1.

When drawer assembly 44 is in the latched or closed orientation, flange 258 extends at an angle δ relative to axis X1 (FIG. 30) such that a portion of flange 258, such as, for example, an end surface 296 of flange 258 directly engages end surface 108 of flange 104 to prevent drawer 140 from translating relative to member 88 along axis X1 in the direction shown by arrow A in FIG. 31. When drawer assembly 44 is in the latched or closed orientation, flange 284 extends at angle ε relative to axis X2 (FIG. 30A) such that a portion of flange 284, such as, for example, an end surface 298 of flange 284 directly engages end surface 120 of flange 114 to prevent drawer 140 from translating relative to member 88 along axis X2 in the direction shown by arrow B in FIG. 31A. In some embodiments, angle δ and/or angle ε is equal to angle α. In some embodiments, angle δ is equal to angle ε. In some embodiments, angle δ and/or angle ε is an acute angle. In some embodiments, angle δ and/or angle ε is an angle between about 1 degree and about 45 degrees. In some embodiments, angle δ and/or angle ε is an angle between about 1 degree and about 35 degrees. In some embodiments, angle δ and/or angle ε is an angle between about 1 degree and about 25 degrees. In some embodiments, angle δ and/or angle ε is an angle between about 1 degree and about 15 degrees. In some embodiments, angle δ and/or angle ε is an angle between about 1 degree and about 5 degrees.

To move drawer assembly 44 from the latched or closed orientation to the unlatched or open orientation, a lifting motion is applied to portion 160 of handle 144. The lifting motion moves portion 160 relative to portion 158 of handle 144 in the direction shown by arrow C in FIG. 6 such that portion 230 (which is already in direct contact with bottom surfaces 268, 294, or bottom surfaces of flanges 260, 286 when sleeves 262, 288 are omitted) applies a force to bottom surfaces 268, 294 (or bottom surfaces of flanges 260, 286 when sleeves 262, 288 are omitted) to move ends 248, 274 in the direction shown by arrow C in FIG. 6 such that flange 258 is spaced apart from flange 102 (flange 258 is positioned above flange 102) to allow drawer 140 to translate relative to member 88 along axis X1 in the direction shown by arrow A in FIG. 31 and flange 284 is spaced apart from flange 114 (flange 284 is positioned above flange 114) to allow drawer 140 to translate relative to member 90 along axis X2 in the direction shown by arrow B in FIG. 31A. That is, when drawer assembly 44 is in the unlatched or open orientation, flange 258 is positioned above flange 102 (between flange 102 and a top lip 95 of member 88) such that flange 258 will not come into contact with flange 102 as flange 258 passes by flange 102 when drawer 140 moves in the direction shown arrow A in FIG. 31 relative to member 88 and flange 284 is positioned above flange 114 (between flange 114 and a top lip 97 of member 90) such that flange 284 will not come into contact with flange 114 as flange 284 passes flange 114 when drawer 140 moves in the direction shown arrow A in FIG. 31 relative to member 90.

When drawer assembly 44 is the unlatched or open orientation, wall 214 of portion 160 directly engages end surface 192 of wall 176 of portion 158, sleeve 262 (or flange 260 when sleeve 262 is omitted) directly engages an inner surface of wall 174 and sleeve 288 (or flange 286 when sleeve 288 is omitted) directly engages the inner surface of wall 174. Wall 206, flange 260 and bottom surface 268 of section 266 each extend non-parallel to axis X1 when drawer assembly 44 is the unlatched or open orientation. Flange 286 and bottom surface 294 of section 292 each extend non-parallel to axis X2 when drawer assembly 44 is the unlatched or open orientation.

When the lifting motion that was applied to portion 160 of handle 144 to move portion 160 relative to portion 158 of handle 144 in the direction shown by arrow C in FIG. 6 ceases, portion 160 moves relative to portion 158 in the direction shown by arrow D in FIG. 7 to return drawer assembly 44 to the latched or closed orientation. That is, unless the lifting motion is applied to portion 160 of handle 144 to move portion 160 relative to portion 158 of handle 144 in the direction shown by arrow C in FIG. 6, drawer assembly 44 will be in the latched or closed orientation.

In operation and use, system 40 may be provided in any area where items are temporarily stored and later retrieved. For example, system 40 is adapted for use in a building, such as, for example, a warehouse to temporarily store various items for later retrieval. System 40 is also adapted for use within various types of vehicles, as discussed herein. In some embodiments, frame 42 may include one or more mounting brackets, such as, for example, brackets 300, 302 that are configured to be mounted to surfaces of a structure, such as, for example, a building or vehicle, to secure frame 42 to the structure.

Drawer assemblies 44 are each biased to the latched or closed orientation, as discussed herein As such, system 40 is provided for use with drawer assemblies 44 each in the latched or closed orientation such that drawers 140 of each of drawer assembly 44 are unable to translate relative to frame 42 along respective axes X1, X2 of each drawer assembly 44.

One of drawer assemblies 44 may be moved from the latched or closed orientation to the unlatched or open orientation while the other drawer assemblies remain in the latched or closed orientation. To move one of drawer assemblies 44 may be moved from the latched or closed orientation to the unlatched or open orientation, a lifting motion is applied to portion 160 of handle 144 of the one drawer assembly 44. The lifting motion moves portion 160 relative to portion 158 of handle 144 in the direction shown by arrow C in FIG. 6 such that portion 130 (which is already in direct contact with bottom surfaces 268, 294, or bottom surfaces of flanges 260, 286 when sleeves 262, 288 are omitted) applies a force to bottom surfaces 268, 294 (or bottom surfaces of flanges 260, 286 when sleeves 262, 288 are omitted) to move ends 248, 274 in the direction shown by arrow C in FIG. 6 such that flange 258 is spaced apart from flange 102 (flange 258 is positioned above flange 102) to allow drawer 140 to translate relative to member 88 along axis X1 in the direction shown by arrow A in FIG. 31 and flange 284 is spaced apart from flange 114 (flange 284 is positioned above flange 114) to allow drawer 140 to translate relative to member 90 along axis X2 in the direction shown by arrow B in FIG. 31A. A driver or delivery person may then remove contents such as packages, equipment or tools that were being temporarily stored in drawer 140 from drawer 140. Once the desired contents are removed from drawer 140, the driver or delivery person may then translate drawer 140 relative to members 88,90 along axes X1, X2 in the direction shown by arrow E in FIG. 31 until drawer 140 is fully closed (drawer 140 is unable to further translate relative to members 88, 90 along axes X1, X2 in the direction shown by arrow E in FIG. 31).

In some embodiments, the driver or delivery person may cease the lifting motion prior to translating drawer 140 relative to members 88, 90 along axes X1, X2 in the direction shown by arrow E such that the upward force applied to bottom surfaces 268, 294 (or bottom surfaces of flanges 260, 286 when sleeves 262, 288 are omitted) is removed before translating drawer 140 relative to members 88, 90 along axes X1, X2 in the direction shown by arrow E. The driver or deliver person may then translate drawer 140 relative to members 88, 90 along axes X1, X2 in the direction shown by arrow E after the upward force applied to bottom surfaces 268, 294 (or bottom surfaces of flanges 260, 286 when sleeves 262, 288 are omitted) is removed. As drawer 140 translates relative to members 88, 90 along axes X1, X2 in the direction shown by arrow E, flange 258 slides over flange 102 and flange 284 slides over flange 114 as flange 258 moves passed flange 102 and flange 284 moves passed flange 114. That is, portion 104 of flange 102 and portion 116 flange 114 are angled relative to axes X1, X2, respectively, such that portions 104, 116 are inclined ramps that allow flange 258 to slide over flange 102 and flange 284 to slide over flange 114 as flange 258 moves passed flange 102 and flange 284 moves passed flange 114. Once drawer 140 is fully closed, drawer assembly 44 will automatically be in the latched or closed orientation because drawer assembly 44 is biased to the latched or closed orientation.

In some embodiments, the driver or delivery person may maintain the lifting motion as drawer 140 translates relative to members 88, 90 along axes X1, X2 in the direction shown by arrow E such that the upward force applied to bottom surfaces 268, 294 (or bottom surfaces of flanges 260, 286 when sleeves 262, 288 are omitted) remains as drawer 140 translates relative to members 88, 90 along axes X1, X2 in the direction shown by arrow E. However, this is not required since flange 260 will slide over flange 102 and flange 284 will slide over flange 114 as drawer 140 translates relative to members 88, 90 along axes X1, X2 in the direction shown by arrow E if the upward force applied to bottom surfaces 268, 294 (or bottom surfaces of flanges 260, 286 when sleeves 262, 288 are omitted) is removed. Once drawer 140 is fully closed, the driver or delivery person may cease the lifting motion prior to translating drawer 140 relative to members 88, 90 along axes X1, X2 in the direction shown by arrow E such that the upward force applied to bottom surfaces 268, 294 (or bottom surfaces of flanges 260, 286 when sleeves 262, 288 are omitted) is removed, which will return drawer assembly 44 to the latched or closed orientation because drawer assembly 44 is biased to the latched or closed orientation.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. An assembly comprising:

a member including a locking element;

a frame;

a handle comprising a first portion and a second portion, the first portion comprising a first wall that is fixed directly to the frame and a second wall that faces the first wall, the first wall defining a cavity, an end of the second portion being disposed in the cavity such that the second portion is rotatable relative to the first portion; and a release coupled to the frame, wherein rotating the second portion relative to the first portion moves the release between a first orientation in which the release directly engages the locking element to prevent the frame from translating relative to the member and a second orientation in which the release is spaced apart from the locking element to allow the frame to translate relative to the member.

2. The assembly recited in claim 1, wherein the first portion includes an arcuate surface, the arcuate surface defining the cavity.

3. The assembly recited in claim 1, wherein the end of the second portion defines a bulbous portion of the second portion.

4. The assembly recited in claim 1, wherein:

the first wall includes an arcuate surface, the arcuate surface defining the cavity; and the end of the second portion defines a bulbous portion of the second portion.

5. The assembly recited in claim 1, wherein a section of the release is positioned in a second cavity defined by the first wall and the second wall.

6. The assembly recited in claim 1, wherein the member extends along a longitudinal axis, the locking element extending at an acute angle relative to the longitudinal axis.

7. The assembly recited in claim 1, wherein the assembly is free of any springs.

8. The assembly recited in claim 1, wherein an extension of the second portion directly engages a bottom surface of the release when the release is in the first orientation and the second orientation.

9. The assembly recited in claim 1, wherein an extension of the second portion directly engages a bottom surface of the release as the release moves between the first orientation and the second orientation.

10. The assembly recited in claim 1, wherein an extension of the second portion directly engages a bottom surface of the release such that an upward force applied to the bottom surface by the extension of the second portion pivots the release relative to the frame to move the release from the first orientation to the second orientation.

11. The assembly recited in claim 1, wherein the second portion applies an upward force to the release to pivot the release relative to the frame and move the release from the first orientation to the second orientation.

12. The assembly recited in claim 1, wherein a lifting motion applied to the second portion causes the second portion to move in a substantially upward direction such that the second portion presses up on a bottom surface of the release to move the release from the first orientation to the second orientation.

13. The assembly recited in claim 1, wherein the release moves from the first orientation to the second orientation by an operator lifting the second portion.

14. The assembly recited in claim 1, wherein a rotating motion of the second portion is translated to an upward movement of the release as the release moves from the first orientation to the second orientation.

15. The assembly recited in claim 1, wherein the release is biased to the first orientation.

16. The assembly recited in claim 1, wherein the release rotates relative to the frame as the release moves from the first orientation to the second orientation.

17. The assembly recited in claim 1, wherein the handle has a maximum width that is greater than a maximum width of the frame.

18. The assembly recited in claim 1, wherein a section of the release is positioned in a second cavity defined by the first wall and the second wall, an extension of the second portion directly engaging a bottom surface of the section such that an upward force applied to the bottom surface by the end of the second portion pivots the release relative to the frame to move the release from the first orientation to the second orientation.

19. An assembly comprising:

a member including a locking element;

a frame;

a handle comprising a first portion and a second portion, the first portion comprising a first wall that is fixed directly to the frame and a second wall that faces the first wall, the first wall defining a cavity, an end of the second portion being disposed in the cavity such that the second portion is rotatable relative to the first portion; and a release coupled to the frame, wherein rotating the second portion relative to the first portion moves the release between a first orientation in which the release directly engages the locking element to prevent the frame from translating relative to the member and a second orientation in which the release is spaced apart from the locking element to allow the frame to translate relative to the member, wherein a section of the release is positioned in a second cavity defined by the first wall and the second wall, wherein the member extends along a longitudinal axis, the locking element extending at an acute angle relative to the longitudinal axis, and wherein the assembly is free of any springs.

20. An assembly comprising:

a member including a locking element;

a frame;

a handle comprising a first portion and a second portion, the first portion comprising a first wall that is fixed directly to the frame and a second wall that faces the first wall, the first wall defining a cavity, an end of the second portion being disposed in the cavity such that the second portion is rotatable relative to the first portion; and a release coupled to the frame, wherein rotating the second portion relative to the first portion moves the release between a first orientation in which the release directly engages the locking element to prevent the frame from translating relative to the member and a second orientation in which the release is spaced apart from the locking element to allow the frame to translate relative to the member, wherein a section of the release is positioned in a second cavity defined by the first wall and the second wall, wherein the member extends along a longitudinal axis, the locking element extending at an acute angle relative to the longitudinal axis, wherein the assembly is free of any springs, and wherein an extension of the second portion directly engages a bottom surface of the release when the release is in the first orientation and the second orientation.

* * * * *